(12) United States Patent
Wada et al.

(10) Patent No.: US 10,678,159 B2
(45) Date of Patent: Jun. 9, 2020

(54) APPARATUS, SYSTEM, AND METHOD

(71) Applicant: CANON KABUSHIKI KAISHA, Tokyo (JP)

(72) Inventors: Satoshi Wada, Machida (JP); Takeshi Yazawa, Yokohama (JP); Kei Yoshizawa, Kawasaki (JP); Naomi Yamamoto, Yokohama (JP); Makoto Torigoe, Tokyo (JP); Yuji Konno, Kawasaki (JP); Hiroshi Tajika, Yokohama (JP); Hidetsugu Kagawa, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 134 days.

(21) Appl. No.: 15/960,248

(22) Filed: Apr. 23, 2018

(65) Prior Publication Data

US 2018/0314182 A1    Nov. 1, 2018

(30) Foreign Application Priority Data

Apr. 28, 2017    (JP) .................... 2017-089640

(51) Int. Cl.
*G03G 15/00*       (2006.01)
*G03G 15/043*      (2006.01)
(Continued)

(52) U.S. Cl.
CPC ....... *G03G 15/043* (2013.01); *G03G 15/5016* (2013.01); *G03G 15/5029* (2013.01);
(Continued)

(58) Field of Classification Search
CPC ............ G03G 15/043; G03G 15/5016; G03G 15/5029; G06T 2200/28; H04N 1/603;
(Continued)

(56) References Cited

U.S. PATENT DOCUMENTS 4,794,460 A * 12/1988 Shiota .................... H04N 1/407
                                                          386/230
5,719,661 A *  2/1998 Terashita ............. G03B 27/735
                                                           355/32
(Continued)

FOREIGN PATENT DOCUMENTS

CN    101540832 A     9/2009
CN    102346400 A     2/2012
(Continued)

*Primary Examiner* — Jingge Wu
(74) *Attorney, Agent, or Firm* — Canon U.S.A., Inc. IP Division

(57) ABSTRACT

An apparatus is configured to determine an illumination condition for irradiating a printed product with light. The printed product is generated by outputting an image onto a recording medium based on fed input image data. The apparatus includes an input unit configured to receive inputs of luminance dynamic range information of the input image data and exposure condition information at the time of imaging regarding the input image data, an acquisition unit configured to acquire characteristic information of the recording medium, and a determination unit configured to determine the illumination condition based on the luminance dynamic range information, the exposure condition information, and the characteristic information.

20 Claims, 22 Drawing Sheets

(51) Int. Cl.
*H04N 5/232* (2006.01)
*H04N 5/235* (2006.01)
*H04N 1/60* (2006.01)

(52) U.S. Cl.
CPC ........... *H04N 1/603* (2013.01); *H04N 1/6088* (2013.01); *H04N 5/2353* (2013.01); *H04N 5/23229* (2013.01); *G06T 2200/28* (2013.01)

(58) Field of Classification Search
CPC . H04N 1/6088; H04N 5/23229; H04N 5/2353
See application file for complete search history.

(56) References Cited

U.S. PATENT DOCUMENTS

| | | | | | |
|---|---|---|---|---|---|
| 5,822,039 | A | * | 10/1998 | Nishida | G03D 13/007 355/27 |
| 5,943,448 | A | * | 8/1999 | Tatsuta | G06K 7/10851 382/270 |
| 5,969,796 | A | * | 10/1999 | Mogi | G03D 13/007 355/27 |
| 2002/0044292 | A1 | * | 4/2002 | Yamada | H04N 1/4078 358/1.9 |
| 2006/0098973 | A1 | * | 5/2006 | Verdier | G03B 17/18 396/291 |
| 2007/0279515 | A1 | * | 12/2007 | Miyazaki | G03H 1/22 348/341 |
| 2008/0187235 | A1 | * | 8/2008 | Wakazono | H04N 5/2355 382/255 |
| 2009/0010535 | A1 | * | 1/2009 | Koishi | G06T 11/001 382/167 |
| 2009/0051794 | A1 | * | 2/2009 | Ando | G06T 5/009 348/274 |
| 2009/0180689 | A1 | * | 7/2009 | Komiya | H04N 1/603 382/167 |
| 2009/0238587 | A1 | * | 9/2009 | Nishihara | H04N 1/4078 399/46 |
| 2012/0020680 | A1 | * | 1/2012 | Zaima | H04N 1/6033 399/15 |
| 2012/0301050 | A1 | * | 11/2012 | Wakazono | H04N 5/23229 382/274 |
| 2013/0163863 | A1 | * | 6/2013 | Nakao | G06K 9/4642 382/165 |
| 2014/0168465 | A1 | * | 6/2014 | Kobayashi | H04N 5/202 348/223.1 |
| 2015/0078661 | A1 | * | 3/2015 | Granados | G06T 5/009 382/167 |
| 2015/0125032 | A1 | * | 5/2015 | Yamanaka | H04N 5/232 382/103 |
| 2015/0281664 | A1 | * | 10/2015 | Tada | H04N 5/217 348/223.1 |
| 2015/0347866 | A1 | * | 12/2015 | Narumi | G06K 9/4652 382/167 |
| 2016/0112621 | A1 | * | 4/2016 | Nishi | H04N 17/002 348/234 |
| 2017/0124689 | A1 | * | 5/2017 | Doba | G03B 15/02 |
| 2017/0205291 | A1 | * | 7/2017 | Shimada | G01J 9/00 |
| 2018/0137375 | A1 | * | 5/2018 | Takemura | H04N 7/18 |

FOREIGN PATENT DOCUMENTS

| | | |
|---|---|---|
| CN | 104717432 A | 6/2015 |
| CN | 104954771 A | 9/2015 |
| CN | 105993170 A | 10/2016 |
| JP | 2009-010566 A | 1/2009 |
| JP | 2011-119944 A | 6/2011 |
| JP | 2012-044475 A | 3/2012 |
| JP | 2014-121019 A | 6/2014 |
| JP | 2015-130157 A | 7/2015 |
| JP | 2016-054356 A | 4/2016 |

* cited by examiner

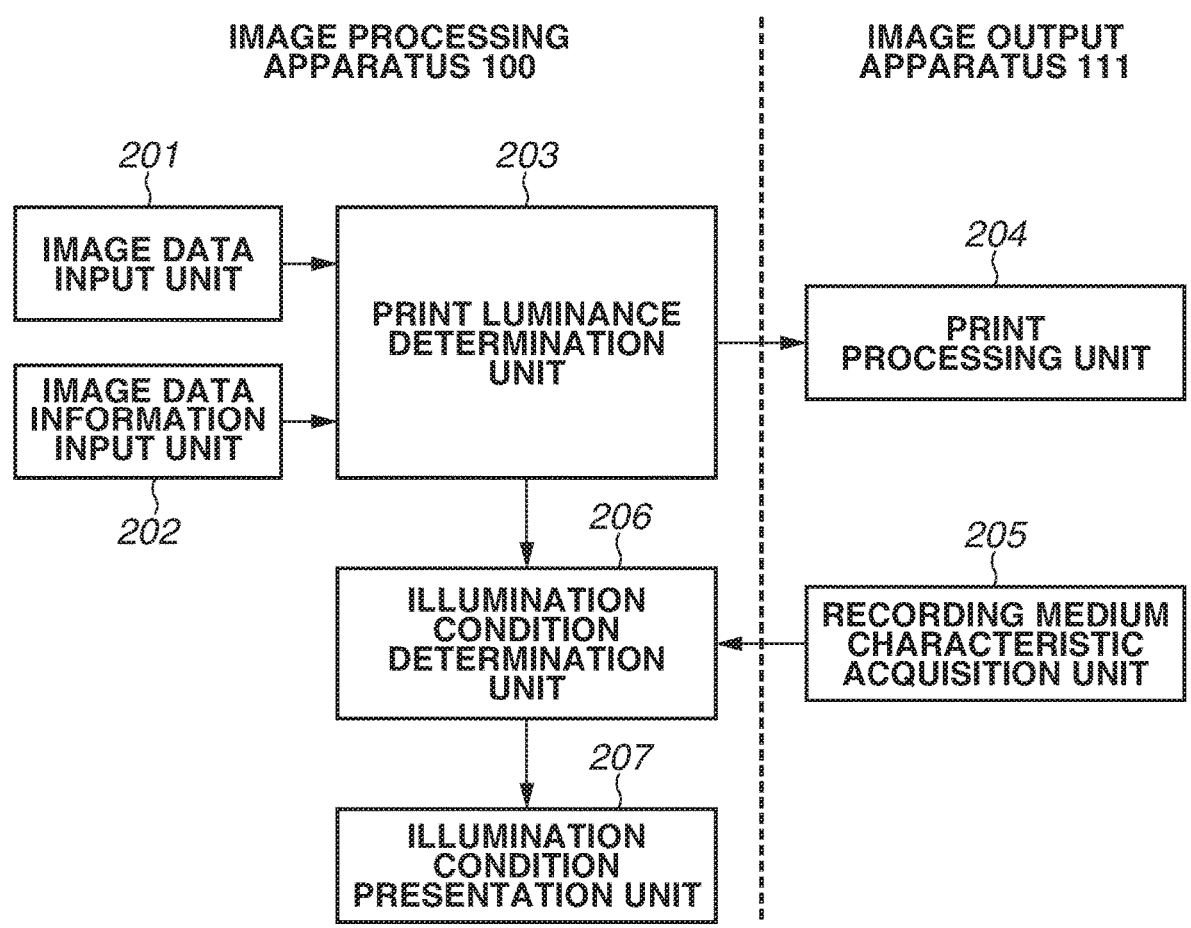

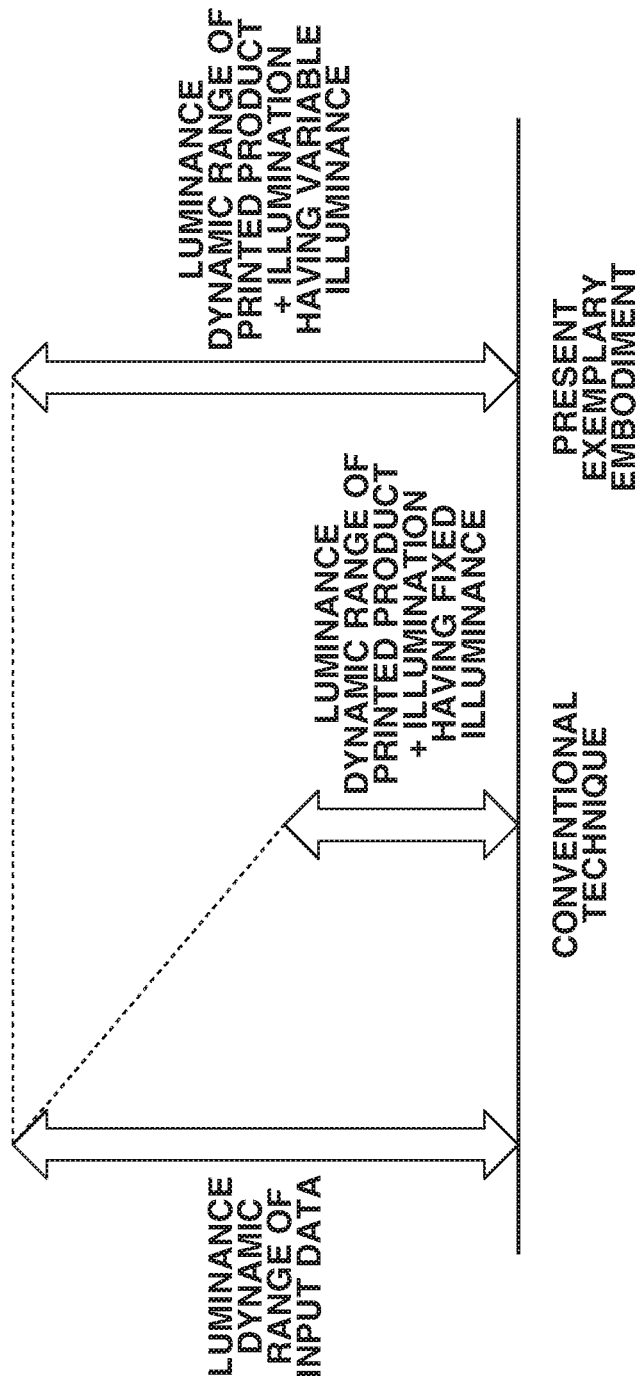

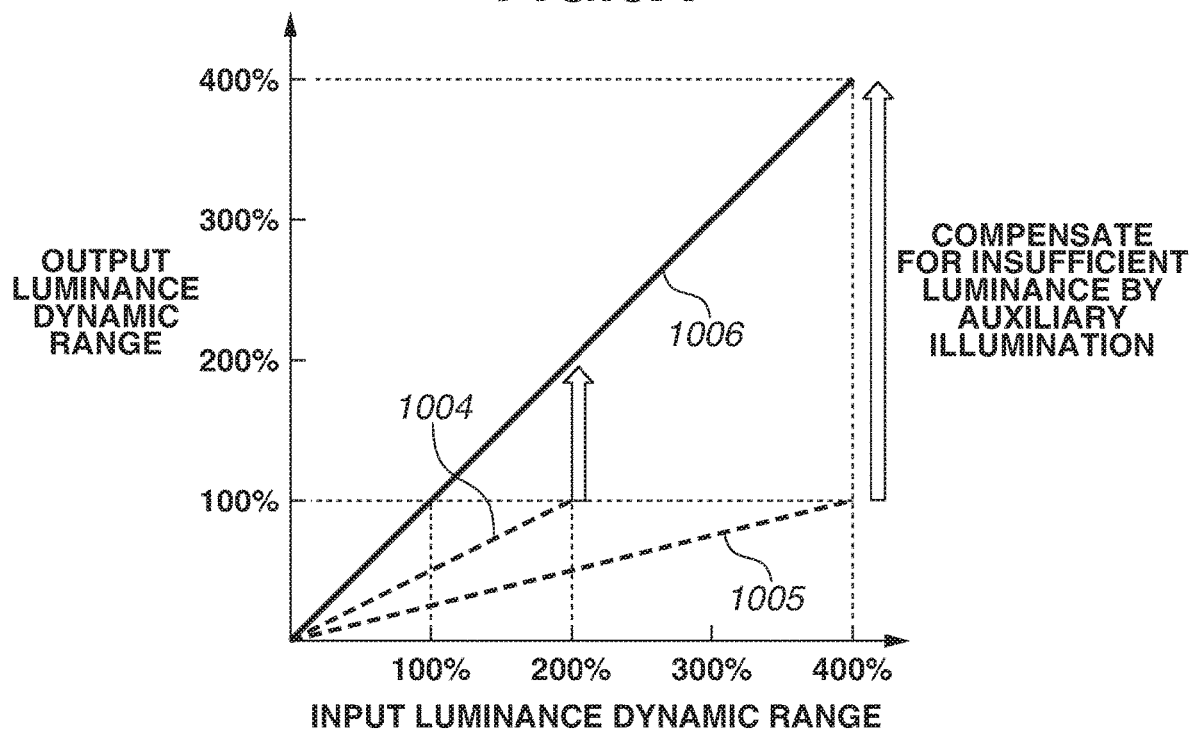
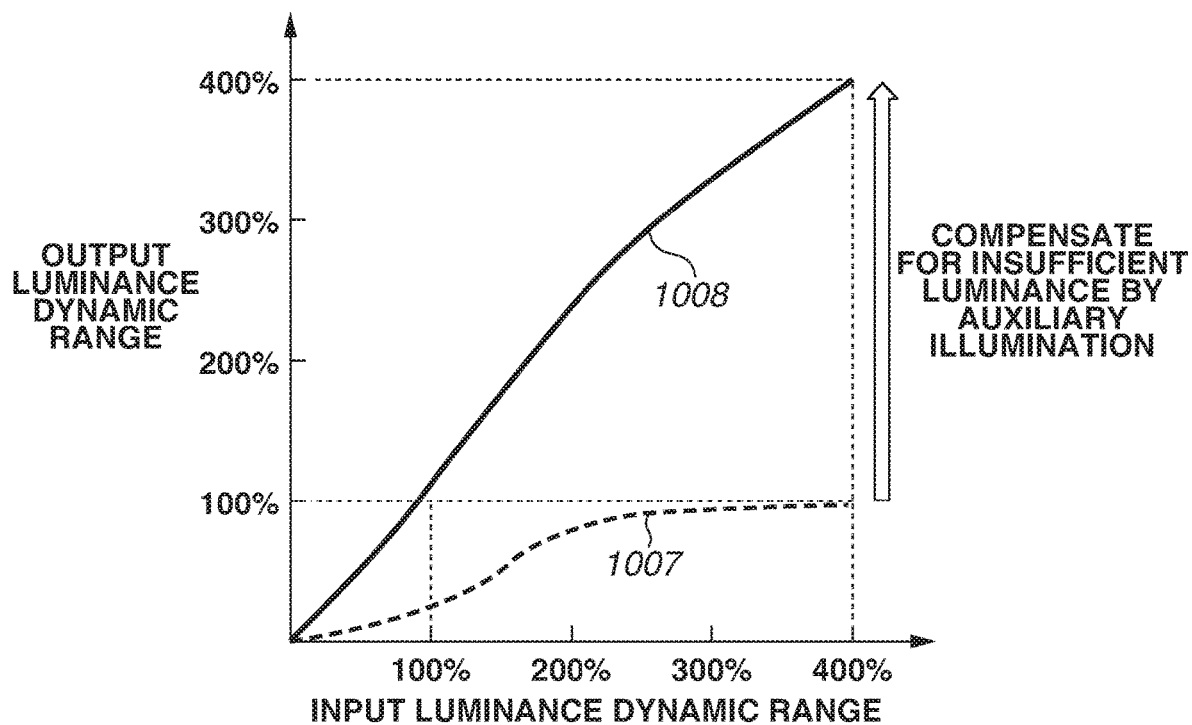

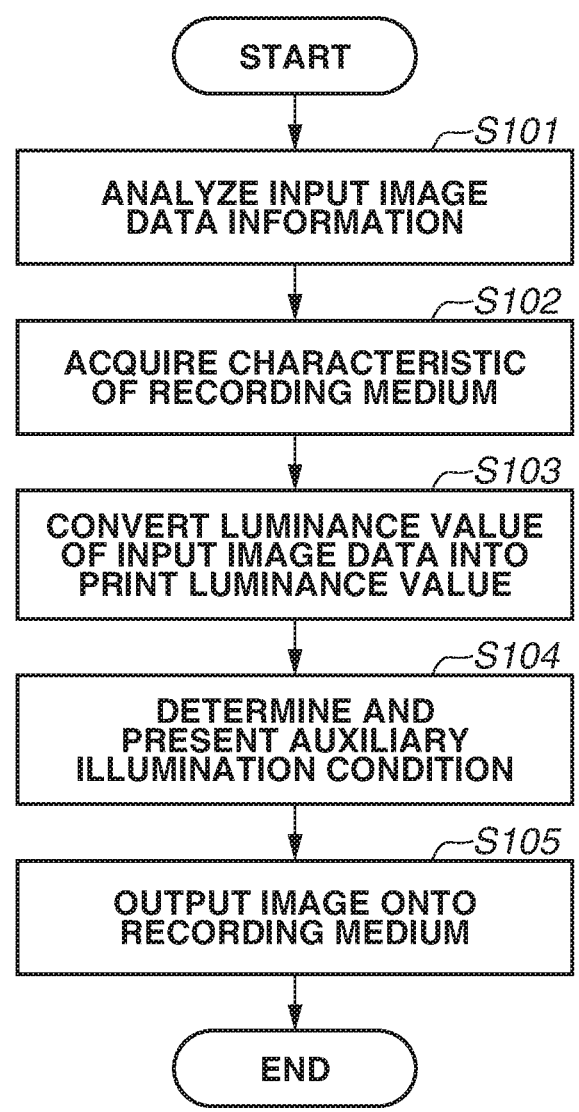

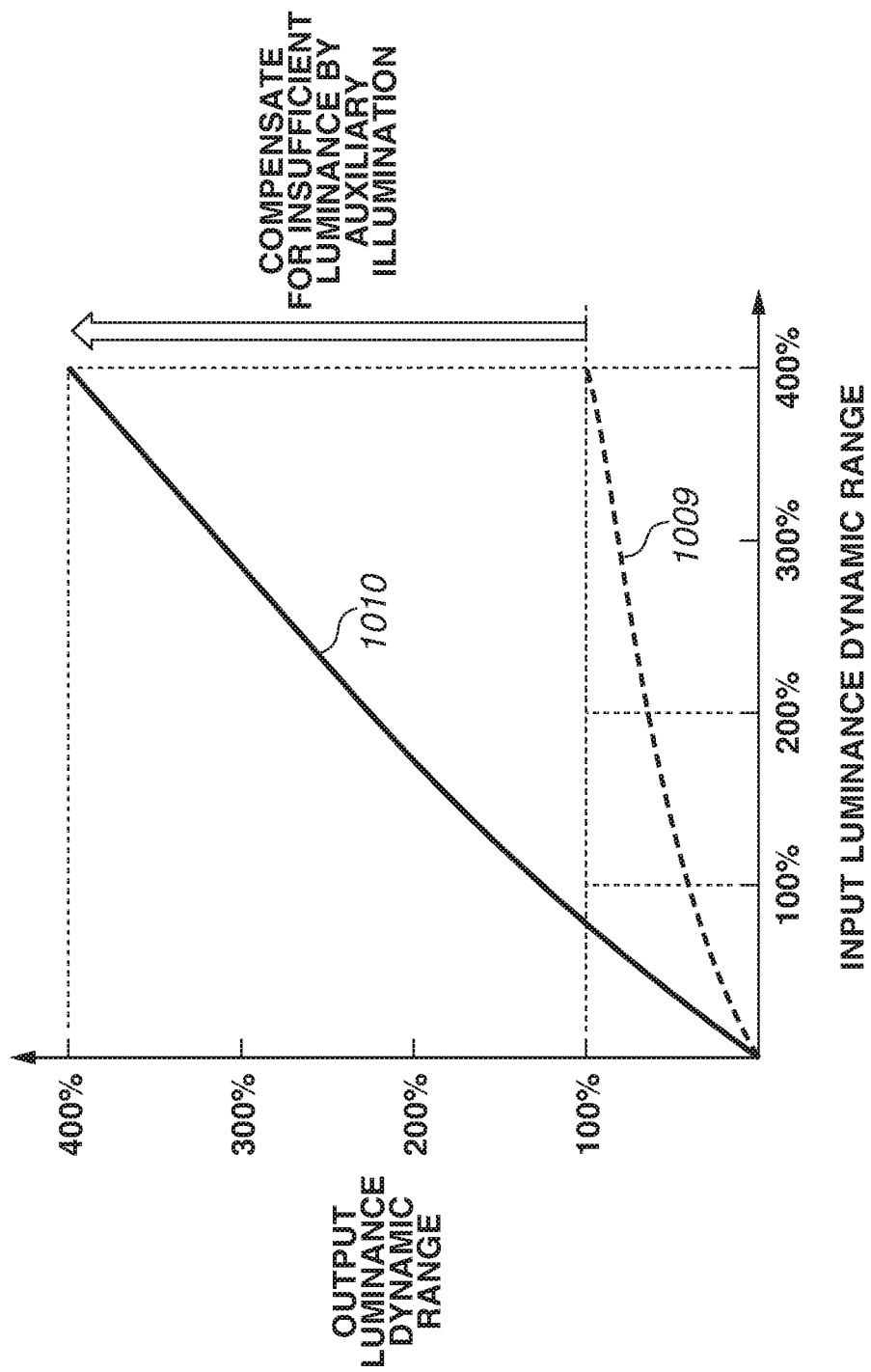

FIG.16

OBSERVATION ENVIRONMENT ILLUMINATION 80 cd/m²

UPPER LIMIT OF AUXILIARY ILLUMINATION 160 cd/m²

OPTIMUM AUXILIARY ILLUMINATION CONDITION 160 cd/m²

FIG.20

OBSERVATION ENVIRONMENT
- ● OFFICE ENVIRONMENT IN JAPAN
- ○ OFFICE ENVIRONMENT IN EUROPE AND UNITED STATES
- ○ HOME ENVIRONMENT IN JAPAN
- ○ HOME ENVIRONMENT IN EUROPE AND UNITED STATES

OPTIMUM AUXILIARY ILLUMINATION CONDITION 120 cd/m$^2$

| RATIO OF DISCRIMINABLE LIGHT | 2.512 | | | | | | | |
|---|---|---|---|---|---|---|---|---|
| STIMULUS AMOUNT | | 100 | 200 | 300 | 400 | 500 | 600 | 700 | 800 |
| STIMULUS AMOUNT OF DISCRIMINABLE LIGHT (= STIMULUS AMOUNT × RATIO) | | 251.2 | 502.4 | 753.6 | 1004.8 | 1256 | 1507.2 | 1758.4 | 2009.6 |
| ΔSTIMULUS AMOUNT | | 151.2 | 302.4 | 453.6 | 604.8 | 756 | 907.2 | 1058.4 | 1209.6 |
| K (= ΔSTIMULUS AMOUNT/STIMULUS AMOUNT) | | 1.512 | 1.512 | 1.512 | 1.512 | 1.512 | 1.512 | 1.512 | 1.512 |

FIG.22

OBSERVATION ENVIRONMENT
ILLUMINATION 80 cd/m²

AUXILIARY ILLUMINATION
CONDITION

UPPER LIMIT VALUE   320 cd/m²
OPTIMUM VALUE       240 cd/m²
LOWER LIMIT VALUE   160 cd/m²

APPARATUS, SYSTEM, AND METHOD

BACKGROUND OF THE INVENTION

Field of the Invention

The aspect of the embodiments relates to an information processing apparatus, an image processing system, a control system, and an information processing method for determining an illumination condition for irradiating a printed product on which an image is output.

Description of the Related Art

Conventionally, image processing apparatuses such as digital copying machines, printers, and facsimile machines using various printing methods such as the inkjet method, the electrophotographic method, and the thermal transfer method have been in widespread use. These image processing apparatuses print an image onto a recording medium to generate a printed product after performing image processing on input image data with use of an image processing unit provided inside the apparatus or software accompanying the apparatus (generally called a printer driver if the image processing apparatus is the printer). The image processing performed as described above is performed assuming that the printed product is observed under a predetermined environment. Therefore, the printed product may be unable to appear in a color desired by an observer under an environment different from the assumed environment.

Now, a specific example in the case of the inkjet printer will be described. Generally, a color image to be output by the printer is subjected to a color design so as to allow the color image to match a color gamut, such as standard red, green, and blue (sRGB), defined by the international standards on a cathode-ray tube (CRT) or a liquid crystal display, which is a display device. The sRGB color gamut is defined under a luminance of 80 cd/m² and a color temperature of 5000K on the CRT and the like. In the present disclosure, assume that the printed product printed by the inkjet printer with the color image matching this sRGB color gamut is desired to be observed under an environment of light equivalent to the luminance of 80 cd/m². Hereinafter, the light corresponding to the luminance of 80 cd/m² and the color temperature of 5000K shall be referred to as "standard illumination".

For such a reason, the printed product may be undesirably observed as a color different from the designed desired color as described above when the printed product is observed under an illumination environment having a luminance or a color temperature largely deviating from the standard illumination. To address such a situation, there is proposed a technique for generating a printed product observable as similar brightness and a similar color to those under the standard illumination even under the observation environment different from the above-described standard illumination.

Japanese Patent Application Laid-Open No. 2012-044475 discusses a technique that switches a lookup table around the black color according to a luminance of a wall because a black region in an image becomes unintentionally prominent due to brightness (reflectance) of the wall opposite from an observation position. Further, Japanese Patent Application Laid-Open No. 2016-054356 discusses measuring and holding a diffuse reflection component and a specular reflection component independently for each printing mode in advance, and predicting a change in a black density or color saturation according to a luminance of a wall. Then, a printing mode for increasing the density or the color saturation is selected based on the above-described prediction.

In this manner, according to Japanese Patent Application Laid-Open No. 2012-044475 and Japanese Patent Application Laid-Open No. 2016-054356, there is such a situation that the black density and the color saturation of the dark portion unintentionally reduce due to the observation environment, and the printed product is not observed as the similar brightness and color to those when being observed under the standard illumination. This situation can be improved by selecting a plurality of lookup tables prepared in advance or the printing mode.

As described above, Japanese Patent Application Laid-Open No. 2012-044475 and Japanese Patent Application Laid-Open No. 2016-054356 discuss the image processing technique for printing the printed product so as to allow the printed product to be observed under the similar color and brightness to those under the standard illumination even under an environment other than the standard illumination.

On the other hand, when data having a wide luminance dynamic range, such as RAW data captured by a digital camera, is input to the printer as the input image data, the input image data is subjected to such luminance conversion processing that the image data is compressed within a luminance dynamic range that the printer can output. This means that, under the standard illumination, the printed product is observed by an observer in a luminance dynamic range corresponding to a sum of the luminance dynamic range of the printed product and a luminance dynamic range of the standard illumination with which the printed product is irradiated. However, even the addition of the luminance dynamic range of the standard illumination is insufficient to reproduce the wide luminance dynamic range held by the input image data, such as the RAW data.

SUMMARY OF THE INVENTION

To address such a situation, the disclosure is directed to reproducing the input image data having the wide luminance dynamic range, such as the RAW data, in a further wide luminance range.

According to an aspect of the embodiments, an apparatus configured to determine an illumination condition for irradiating a printed product with light, the printed product being generated by outputting an image onto a recording medium based on fed input image data, the apparatus includes an input unit configured to receive inputs of luminance dynamic range information of the input image data and exposure condition information at the time of imaging regarding the input image data, an acquisition unit configured to acquire characteristic information of the recording medium, and a determination unit configured to determine the illumination condition based on the luminance dynamic range information, the exposure condition information, and the characteristic information.

Further features of the disclosure will become apparent from the following description of exemplary embodiments with reference to the attached drawings.

BRIEF DESCRIPTION OF THE DRAWINGS

FIG. 2 illustrates an example of a processing configuration of the image processing apparatus and the image output apparatus.

FIG. 4 illustrates a general idea of luminance dynamic ranges for facilitating better understanding thereof.

FIGS. 6A and 6B each illustrate a relationship between the input luminance range and the output luminance range.

FIG. 8 is a flowchart illustrating a flow of processing according to a first exemplary embodiment.

FIG. 9 illustrates processing for converting image data.

FIG. 16 illustrates an example of a screen on which the user configures settings.

FIG. 20 illustrates an example of a screen presented to the user.

FIG. 22 illustrates an example of a method for presenting the illumination condition.

DESCRIPTION OF THE EMBODIMENTS

In the following description, an exemplary embodiment of the disclosure will be described with reference to the drawings. In the following description, candela ($cd/m^2$) will be used as a unit of an intensity of light, but the unit of an intensity of light is not limited thereto and lumen (lm) or lux (lx) may be used therefor.

Figure 12:
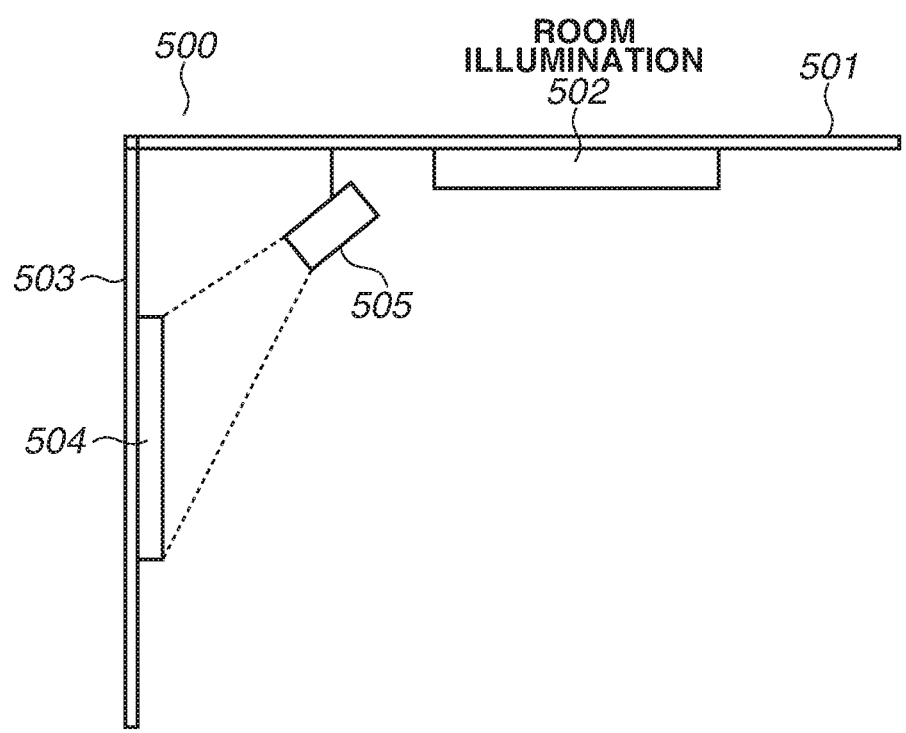
FIG. 12 is a conceptual diagram illustrating a positional relationship between a printed product and illumination.

FIG. 12 is a conceptual diagram illustrating a room 500 in cross section. Room illumination 502 is installed on a ceiling 501. A printed product 504 output by an inkjet printer, which will be described below, is decorated on a wall 503. The room illumination 502 is the standard illumination corresponding to the luminance of 80 $cd/m^2$ and the color temperature of 5000K. In the present disclosure, assume that the printed product output by the printer is subjected to a color design with a view of being observed under the standard illumination. On the other hand, the printed product 504 can also be exhibited in combination of the room illumination 502 and auxiliary illumination 505, as seen in a museum and a photo exhibition. A broken line in FIG. 12 indicates a general idea about how the auxiliary illumination 505 irradiates the printed product 504. In this case, it is effective to change the printing mode according to an observation environment thereof with use of the technique discussed in the above-described patent literature, Japanese Patent Application Laid-Open No. 2016-054356.

Now, a configuration of the present exemplary embodiment will be described with reference to FIG. 4. As illustrated in FIG. 4, generally, a luminance dynamic range of input image data input from an imaging unit, such as a camera, is wider than a luminance dynamic range of a printed product+illumination having a fixed illuminance. In this case, the input image data is subjected to processing for reducing the luminance range according to a luminance range of a recording medium such as paper, which is a non-light emitting object. On the other hand, the present exemplary embodiment is directed to reproducing the luminance dynamic range of the input image data from a luminance dynamic range of the printed product+illumination having a variable illuminance by adjusting an illumination condition, such as using the auxiliary illumination.

Figure 1A:
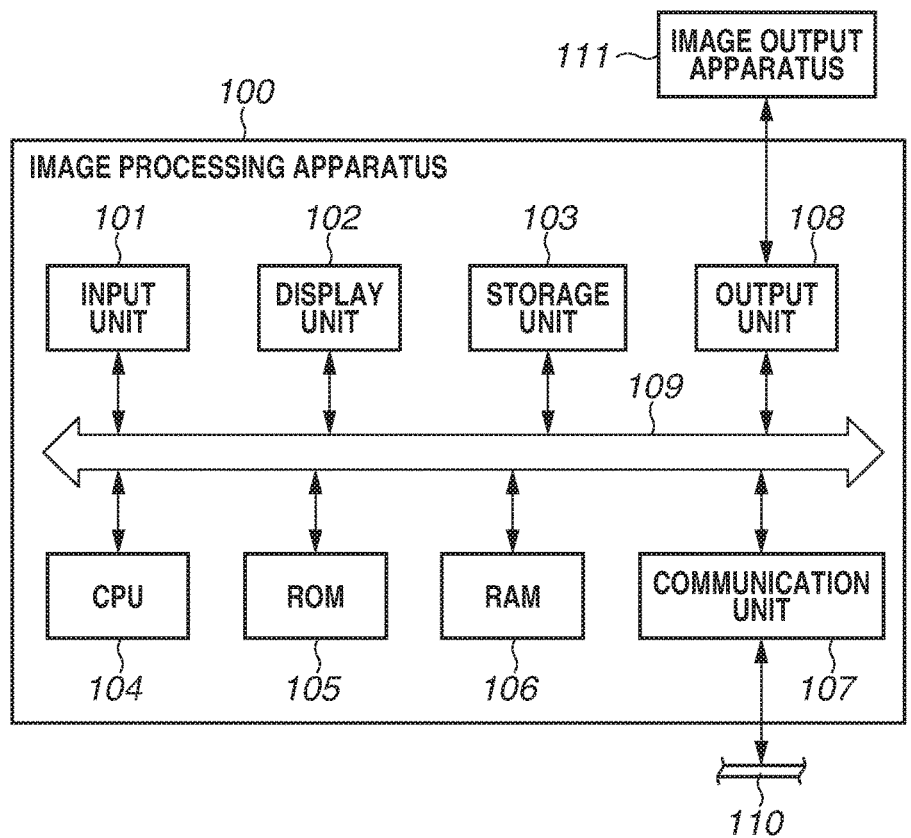
FIG. 1A is a block diagram illustrating a configuration of an image processing apparatus.

FIG. 1A illustrates an example of a configuration of an information processing apparatus functioning as an image processing apparatus 100 according to the present exemplary embodiment. A central processing unit (CPU) 104 executes an operating system (OS) and various kinds of programs stored in a read only memory (ROM) 105 and a storage unit 103 with use of a random access memory (RAM) 106 as a work memory, thereby controlling a configuration that will be described below via a system bus 109.

An input unit 101 is a serial bus interface, such as Universal Serial Bus (USB). Then, an input device, such as a keyboard and a mouse, and an image input device, such as a memory card reader, a digital camera, and a scanner, are connected to the input unit 101. The CPU 104 inputs a user instruction, image data, and the like via the input unit 101, and displays a graphical user interface (GUI), an image, a processing progress, a result, and the like on a display unit 102, which is a monitor.

The storage unit 103 is a recording medium storing various kinds of programs and various kinds of data therein, such as a hard disk drive (HDD) and a solid-state drive (SSD). The programs stored in the storage unit 103 include a program for realizing image processing that will be described below.

A communication unit 107 is a network interface for connecting to a wired or wireless network 110, such as Ethernet (registered trademark), Bluetooth (registered trademark), Wireless Fidelity (Wi-Fi), and peer-to-peer (P2P). An output unit 108 is a serial bus interface, such as USB, and outputs image data and the like to an image output apparatus 111 or a memory card writer connected to the serial bus.

The CPU 104 communicates with a server apparatus and another computer apparatus in the network 110 via the communication unit 107. The CPU 104 can receive various kinds of programs and data from the server apparatus, the other computer apparatus, or the like in the network 110 to perform processing, and provide data of a processing result to the server apparatus or the other computer apparatus in the network 110. Computer apparatuses that the CPU 104 can communicate via the communication unit 107 also include the image output apparatus 111, and the CPU 104 can also output the image data to the image output apparatus 111.

The image processing apparatus 100 is realized by supplying the program for realizing the image processing that will be described below to a computer apparatus, such as a personal computer, a tablet, and a smartphone. In the case where the tablet or the smartphone is used as the image processing apparatus 100, the input unit 101 and the display unit 102 can be configured as a touch panel by being stacked on each other.

Figure 1B:
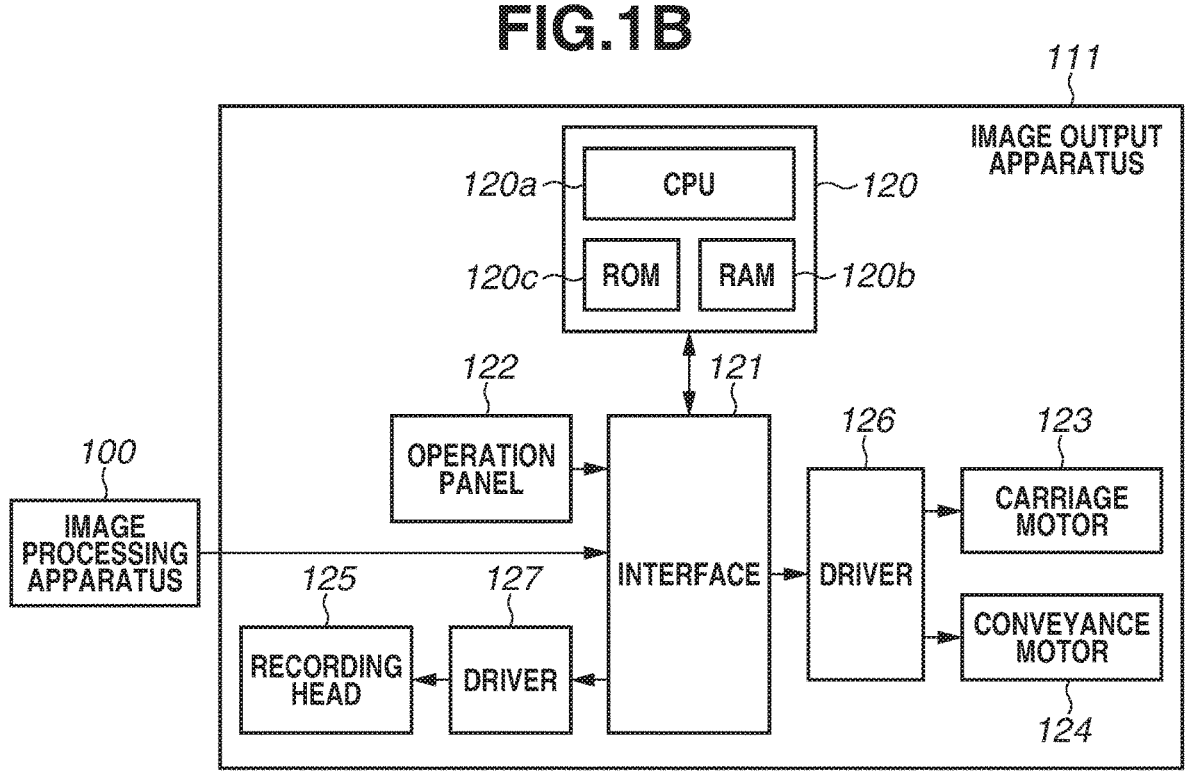
FIG. 1B is a block diagram illustrating a configuration of an image output apparatus.

FIG. 1B is a block diagram illustrating an example of a configuration when the inkjet printer is assumed to be employed as the image output apparatus 111. A control unit 120 includes a CPU 120*a*, such as a microprocessor, and a RAM 120*b*, a ROM 120*c*, and the like as memories. The RAM 120*b*, for example, temporarily stores therein various kinds of data such as the image data received from the image processing apparatus 100 and generated recording data, along with being used a work area of the CPU 120*a*. The ROM 120*c* stores therein a control program of the CPU 120*a* and various kinds of data such as a parameter needed for a recording operation.

The control unit 120 performs processing for inputting/outputting the data and the parameter used to record the image data and the like between the image output apparatus 111 and the image processing apparatus 100 via an interface 121. Further, the control unit 120 performs processing for receiving inputs of various kinds of information, such as a character pitch and a character type, from an operation panel 122. Further, the control unit 120 outputs an ON signal or an OFF signal for driving a carriage motor 123 and a conveyance motor 124 from a driver 126 via the interface 121. Further, the control unit 120 outputs a discharge signal or the like to a driver 127, thereby controlling driving for discharging ink from a recording head 125. The control unit 120 reads out the program stored in the RAM 120*b*, by which each of the above-described processing procedures is realized.

FIGS. 1A and 1B illustrate an example of an image processing system in which the image processing apparatus 100 and the image output apparatus 111 are configured as different apparatuses from each other, but the applicability of the present exemplary embodiment is not limited to the above-described configuration. The present exemplary embodiment may be applied to an image forming apparatus in which the image processing apparatus 100 and the image output apparatus 111 are configured as an integrated apparatus. For example, the present exemplary embodiment can be applied to a system that introduces the configuration of the image output apparatus 111 into the image processing apparatus 100 and controls the printer as so-called printer driver software. Further, the present exemplary embodiment can also be applied to, for example, an image copying apparatus including an image reading device.

FIG. 2 is a block diagram illustrating an example of a processing configuration of the image processing apparatus 100 and the image output apparatus 111 illustrated in FIGS. 1A and 1B. The processing configuration illustrated in FIGS. 1A and 1B is realized by supplying a program for realizing this processing configuration and a function thereof to the image processing apparatus 100 and the image output apparatus 111 and executing this program.

The image data is input from the digital camera or the like via an image data input unit 201, and, at the same time, image data information, such as information at the time of imaging, for example, exposure condition information, and luminance dynamic range information, is input via an image data information input unit 202. A print luminance determination unit 203 generates print data (output luminance data) for printing the image data from the input image data and image data information. The generated print data is transmitted to a print processing unit 204 in the image output apparatus 111. Then, after the print data is subjected to each processing procedure in the image output apparatus 111, a printed product is output.

On the other hand, a recording medium characteristic acquisition unit 205 of the image output apparatus 111 acquires characteristic information indicating a characteristic of the recording medium from data databased in advance, by the user's selecting the recording medium to use. Then, the acquired characteristic data of the recording medium is transmitted to an illumination condition determination unit 206 of the image processing apparatus 100. The illumination condition determination unit 206 determines a needed illumination condition based on a difference between the luminance dynamic range of the input image data and a luminance dynamic range of the print data that is calculated by the print luminance determination unit 203, and the characteristic data of the recording medium. A method for determining this illumination condition will be described in detail below. Then, an illumination condition presentation unit 207 presents the determined illumination condition to the user.

Figure 3A:
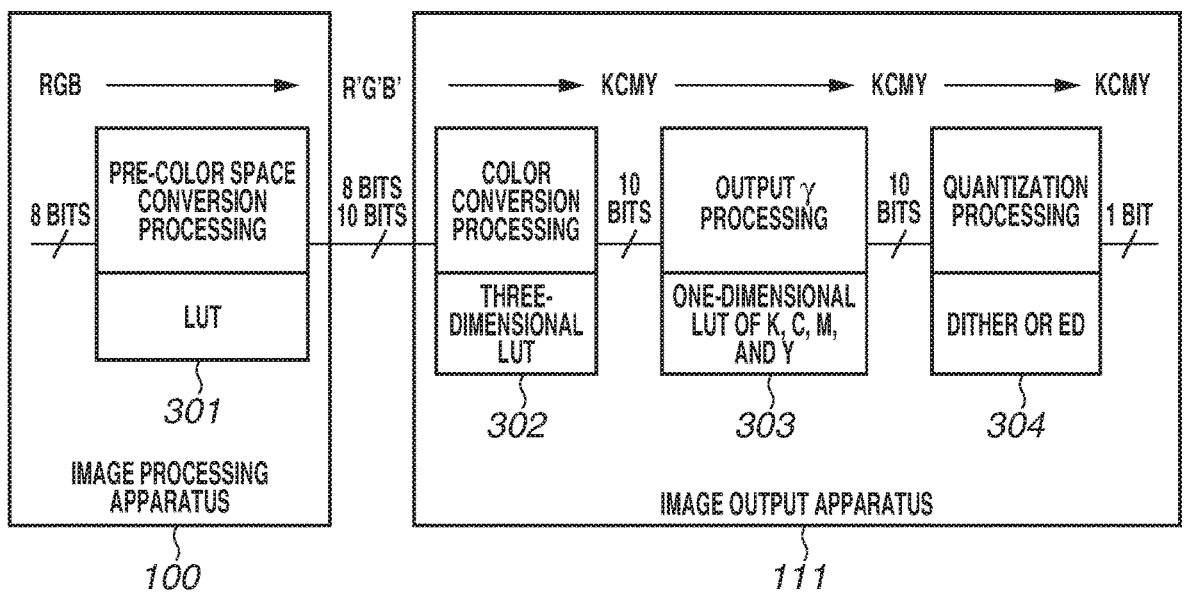
FIG. 3A illustrates an image processing procedure.

FIG. 3A illustrates image processing for outputting color input image data onto the recording medium when the image output apparatus 111 is assumed to be the inkjet printer. The print processing unit 204 of the image output apparatus 111 receives image data (luminance data) of 8 bits for each of red (R), green (G), and blue (B) colors, i.e., 256 tones for each of them that is held by a commonly used image file, such as Joint Photographic Experts Group (JPEG). After the image data is subjected to a plurality of processing procedures, the image output apparatus 111 eventually outputs bit image data (recording data) of 1 bit indicating whether to discharge an ink droplet for each of black (K), cyan (C), magenta (M), and yellow (Y). In the following description, these processing procedures will be described.

First, the image processing apparatus 100 receives the input image data expressed by a luminance signal of 8 bits for each of the R, G, and B colors from the digital camera or the like. Then, the image processing apparatus 100 performs pre-color space conversion processing 301 on the received luminance signal data of R, G, and B. In the present example, the image processing apparatus 100 converts the luminance signal data into R', G', and B' data of 8 bits or 10 bits for each of the colors with use of a three-dimensional lookup table (LUT). This pre-color space conversion processing 301 is performed to correct a difference between a color space expressed by the input R, G, and B image data and a color space reproducible by the image output apparatus 111. More specifically, this processing is called color gamut (gamut) mapping processing, and a conversion from RGB to XYZ, which is a color space conversion, is carried out and then a conversion from XYZ to R'G'B' is carried out after that, by which a color gamut held by the input data is converted into a color gamut reproducible by the printer. In this process, the luminance range held by the input data, i.e., a Y component in the XYZ data, is converted into a luminance range reproducible by the image output apparatus 111. As a result, the luminance range expressible by the image output apparatus 111 corresponds to the luminance range of the printed product under the standard illumination. This luminance range will be described in detail below.

Next, the data of each of the R', G', and B' colors subjected to the pre-color space conversion processing 301 and the luminance conversion processing at the same time as that is transmitted from the image processing apparatus 100 to the image output apparatus 111. The image output apparatus 111 performs color conversion processing 302 for converting the data of each of the R', G', and B' colors subjected to the pre-color space conversion processing 301 into data of 10 bits for each of K, C, M, and Y colors with use of a three-dimensional LUT. In the color conversion processing 302, the RGB-system image data of the input system that is expressed by the luminance signal is converted, as a color conversion, into ink color data corresponding to ink of each of K, C, M, and Y used by the image output apparatus 111.

Figure 3B:
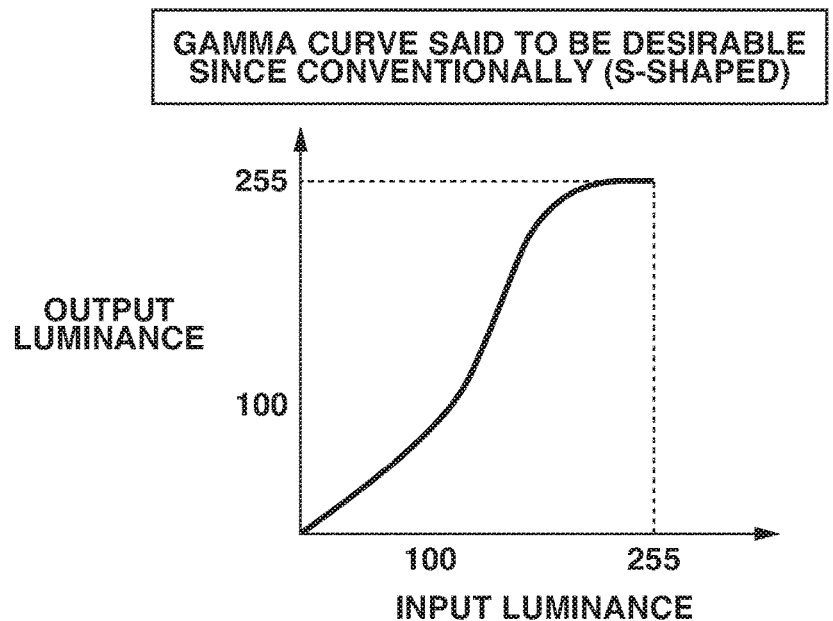
FIG. 3B illustrates an example of a gamma curve.

Next, output γ processing 303 is performed on the ink color data of 10 bits for each of the K, C, M, and Y colors subjected to the color conversion processing 302 with use of a one-dimensional LUT corresponding to each of the colors. FIG. 3B illustrates an example of a gamma curve (S-shaped γ) used in the output γ processing 303. Normally, a linear relationship is not established as a relationship between the number of ink droplets (dots) supplied per unit area of the recording medium and a recording characteristic, such as a reflection density acquired by measuring the recorded image. Therefore, an input tone level of each of the four colors should be corrected so as to establish a linear relationship between the input tone level of 10 bits for each of the K, C, M, and Y colors and the density level of the image recorded according thereto. In other words, the γ processing aims to further accurately reproduce the input image data when the printed product is output by the image output apparatus 111. Generally, a linear relationship is not established between a result of the printed product and the input image due to the characteristic of the recording medium even if the input image data is processed by linear processing and is output in this state by the image output apparatus 111. This may raise a necessity of measuring the characteristic of the recording medium to be used in advance and designing a gamma curve that allows the input and the output to have a more linear relationship therebetween.

Referring back to FIG. 3A, quantization processing 304, such as dither or error diffusion processing (ED), is performed on the ink color data subjected to the output γ processing 303. More specifically, the ink color data is converted from the data of 10 bits for each of the K, C, M, and Y colors into binary data of 1 bit for each of the colors that indicates whether to discharge or not to discharge the ink droplet. The ink droplet is discharged from the recording head 125 based on the converted binary data, and the printed product is output.

Figure 5A:
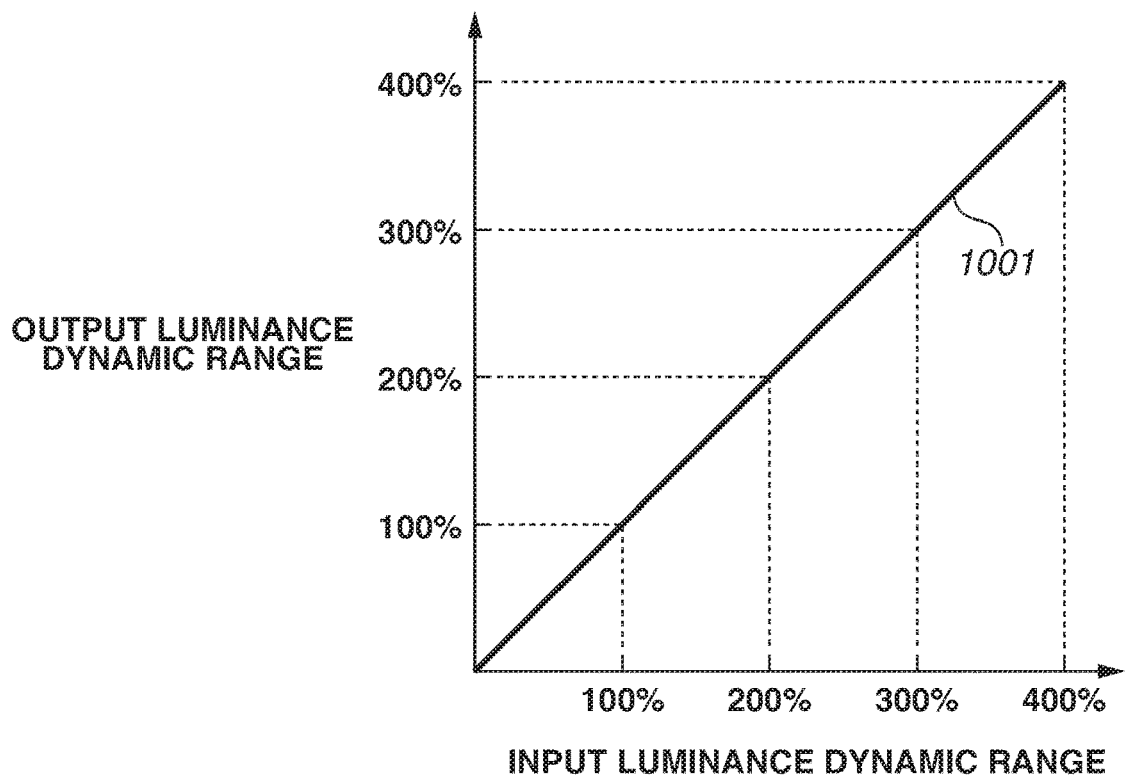
FIGS. 5A and 5B each illustrate a relationship between an input luminance range and an output luminance range.

Next, a relationship between the input luminance range and the output luminance range in the luminance conversion processing performed at the same time as the pre-color space conversion processing 301 will be described with reference to FIG. 5A. FIG. 5A illustrates the relationship in a case of an ideal example in which the input luminance range is linearly converted into the output luminance range. If the output luminance range of the printed product can sufficiently express the luminance range of the input data, the conversion can be appropriately achieved just by converting the input into the output so as to produce an output linear with respect to the input as indicated by a solid line 1001 in FIG. 5A. However, generally, the luminance range expressible by the printed product printed on the non-light emitting object, such as the paper, under the standard illumination is narrower than the input luminance range. An output luminance on the paper, i.e., a maximum luminance on paper white is determined by an intensity of illumination with which the printed product is irradiated under an environment in which this printed product is observed. Generally, in the case where the color design employed in the inkjet printer is the sRGB color space, the conversion processing is performed assuming that the luminance dynamic range is 0 to 80 cd/m$^2$. Therefore, if the luminance range of the input image data falls within the range of 0 to 80 cd/m$^2$, the input image data is subjected to such processing that the luminance range is not changed thereby. However, for input image data having a luminance range exceeding that, the conversion processing should be performed so as to allow the input image data to fall within the range of the luminance dynamic range expressible on an output side, i.e., on the recording medium.

Figure 5B:
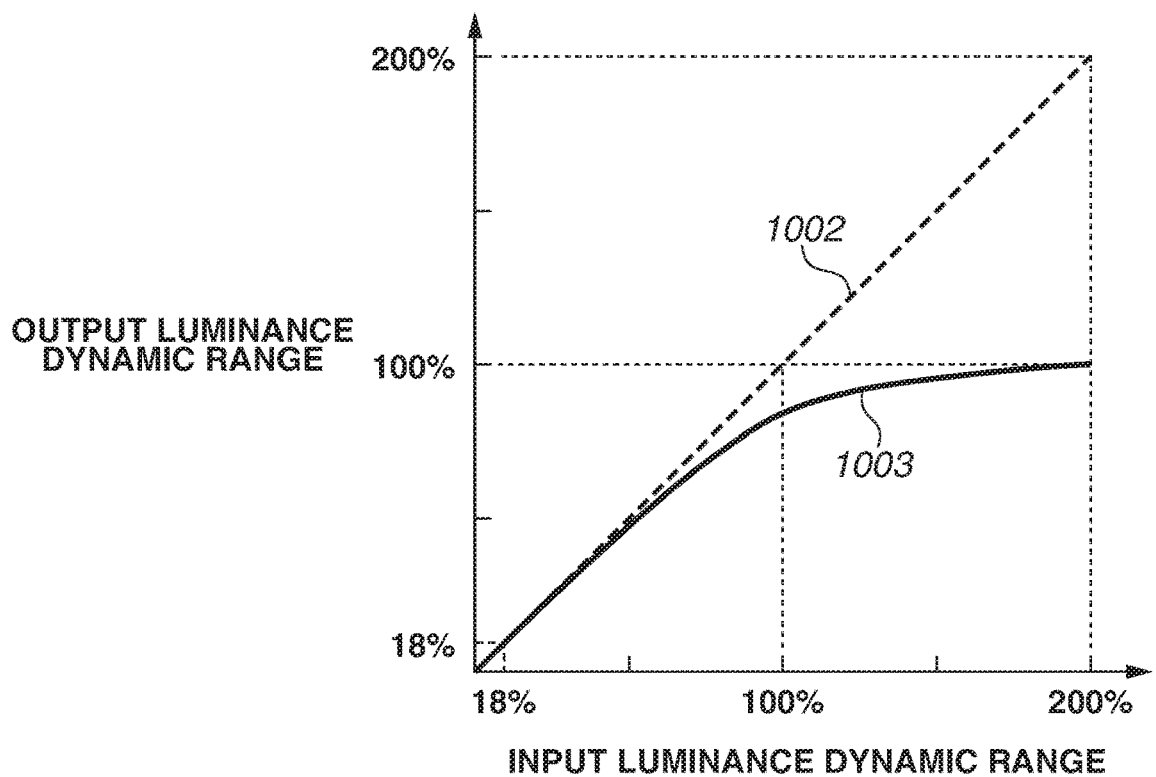

FIG. 5B illustrates normal processing, i.e., the conversion processing actually performed assuming that the printed product is observed under the standard illumination, when the printed product is printed on the recording medium such as the paper. FIG. 5B illustrates an example indicating a luminance conversion (a gamma curve) for outputting input image data having a luminance dynamic range of 0 to 200% by the inkjet printer. In this case, conversion processing curved like a solid line 1003 is performed instead of a linear conversion like a broken line 1002.

When the image is output on the recording medium such as the paper, which is the non-light emitting body, a maximum value of reflectance is 100%. In the present example, a luminance on a white background (hereinafter referred to as a paper white region) of glossy paper is assumed to correspond to reflectance of 100%, and is defined to be 80 cd/m$^2$ in the case of the above-described sRGB color space. Therefore, the luminance 80 cd/m$^2$ on the paper white region of the glossy paper corresponds to the reflectance of 100%. In the normal processing established assuming that the printed product is observed under the standard illumination, the input image data having the dynamic range of 0 to 200% is converted as indicated by the solid line 1003. Generally, so-called 18% gray reflectance, which is close to reflectance of a human skin color, maintains a similar output luminance to the luminance of the input image data. Therefore, a generally used gamma curve is designed in such a manner that the solid line 1003 overlaps the broken line 1002 in a range of 0 to 18% like in FIG. 5B. Further, the shape of the curve can be changed according to a designer's intention.

[Processing Method]

Next, a specific data processing method by the print luminance determination unit 203 in the image processing apparatus 100 will be described. As described above, the present exemplary embodiment is directed to reproducing an imaging scene, i.e., reproducing the luminance dynamic range of the input image data on the recording medium by actively controlling the illumination condition when the printed product is observed. Therefore, the present exemplary embodiment is constructed assuming that the luminance dynamic range of the input image is wider than the dynamic range when the printed product is irradiated by a standard light source of the luminance of 80 cd/m$^2$.

In the present exemplary embodiment, the image data input to the image data input unit 201 of the image processing apparatus 100 is RGB data generated by linearly developing RAW data handled by recent digital cameras and the like. The RAW data is image data in an unprocessed state before the data is subjected to various kinds of processing and converted into JPEG data inside the camera. Further, a luminance dynamic range of the RAW data is wider than a luminance dynamic range of the JPEG data. Imaging information of the RAW data, such as an exposure condition, is input to the image data information input unit 202 along with the input of the RAW data to the image data input unit 201. This information can be received as Exchangeable image file format (Exif) data of the digital camera. The Exif data includes the dynamic range of the image data, and an exposure state at the time of the imaging, i.e., a so-called exposure compensation value. In the present exemplary embodiment, the image data is assumed to have a negative value as the exposure compensation value, i.e., assumed to be underexposed image data.

As described above, the print luminance determination unit 203 converts the RGB luminance data, which is the input image data, from RGB to XYZ, and further converts the image data from XYZ to R'G'B', thereby determining a pixel value of each pixel.

FIGS. 6A and 6B each illustrate a relationship between the input luminance dynamic range and the output luminance dynamic range in the luminance conversion processing according to the present exemplary embodiment. First, supposing that the information input to the image data information input unit 202 is, for example, the RAW image data having the dynamic range of 0 to 200% and information meaning the exposure compensation value=−1, i.e., underexposure by one exposure value, the relationship in this case will be described. Now, if the image is captured with the exposure compensation value set to −1, an output luminance is converted on the digital camera side so as to match a half of the input luminance in a case of a correct exposure (i.e., in a case where the exposure compensation value is 0). Then, the converted data is input to the printer. The data input at this time is data converted in such a manner that a luminance value at 200% in the input luminance dynamic range reduces by half as indicated by a broken line 1004 in FIG. 6A. In other words, the output luminance dynamic range falls within 100%.

Similarly, if the input image data is RAW image data having a dynamic range of 0 to 400% and is captured with the exposure compensation value set to −2, the output luminance is converted on the digital camera side so as to match one-fourth of the input luminance. Then, the converted data is input to the printer. The data input at this time is data converted in such a manner that a luminance value at 400% in the input dynamic range reduces to one-fourth as indicated by a broken line 1005 in FIG. 6A. In this case, the output dynamic range also falls within 100%.

Therefore, in the case of any of the above-described two examples, the output luminance is converted so as to fall within the range of 0 to 100% and is a luminance reproducible on the printer side, so that the luminance value does not have to be narrowed more than that.

On the other hand, if the input image data is the RAW image data having the luminance dynamic range of 0 to 400% and is information indicating the exposure compensation value=−1, i.e., underexposure by one exposure value, the input data is data in which the luminance value at 400% is converted into a half. In this case, the output luminance dynamic range exceeds the luminance value range reproducible on the printer side. Therefore, the output luminance should be converted so as to fall within the range of 0 to 100% reproducible by the printer. A broken line 1007 in FIG. 6B indicates data after the conversion on the printer side.

In the configuration according to the present exemplary embodiment, the printed product is irradiated with light at an illuminance higher than the standard illumination assumed to provide the luminance of 80 cd/m² by using the auxiliary illumination. By this irradiation, the luminances indicated by the broken line 1004 and the broken line 1005 in FIG. 6A are raised to a luminance indicated by a solid line 1006, and the luminance indicated by the broken line 1007 in FIG. 6B is raised to a luminance indicated by a solid line 1008. Therefore, in the case of any of the broken line 1004, the broken line 1005, and the broken line 1007, the printed product appears as an extremely dark image compared to the printed product output by the normal processing illustrated in FIG. 5B, when the printed product output on the recording medium is observed under the standard illumination.

In the above-described manner, the image processing apparatus 100 receives the RAW data linearly developed on the imaging device side, such as the digital camera, and the information indicating the luminance dynamic range and the negative exposure compensation value, which is the exposure condition, as the information at the time of the imaging of the RAW data. Then, the image processing apparatus 100 performs the processing for converting the image data into the luminance dynamic range expressible by the image output apparatus 111 based on the received information. The RAW data is used in the present exemplary embodiment because the RAW data can be linearly processed, and, further, maintains the 18% gray image even when the printed product is irradiated with the auxiliary illumination, thus allowing the image of the imaging scene under the correct exposure to be reproduced. Further, the RAW data contains the number of tones for one pixel as large as 12 bits to 16 bits, and therefore may have an advantage of allowing the image to be acquired with smooth gradation and reduce deterioration of an image quality even after being subjected to the image processing.

Next, processing for each type of the recording medium will be described. As described above, the reflectance and the luminance value on the paper white region of the glossy paper are assumed to be 100% and 80 cd/m², respectively. However, the recording medium has lower reflectance than the glossy paper depending on a surface condition of the used recording medium, and therefore the luminance value also falls below 80 cd/m² on the paper white region having the reflectance of 100%. Examples thereof include less glossy mat paper and plain paper. Then, in the present exemplary embodiment, assume that a luminance value on the paper white region of the mat paper is 60 cd/m², and a luminance value on the paper white region of the plain paper is 40 cd/m². A needed intensity of the auxiliary illumination is different depending on the luminance on the recording medium to compensate for insufficiency corresponding to the luminance dynamic range of the input image data. This difference can be handled by saving data indicating what kind of condition should be used for the conversion in the storage unit such as the ROM for each type of the recording medium in advance, and acquiring corresponding data at a timing when the recording medium to be used is selected.

[Method for Determining Illumination Condition]

Next, a method for determining the illumination condition will be described. As described above, the printed product printed by the image output apparatus 111 has the narrower luminance dynamic range than the input image data, and therefore appears as a dark image under the standard illumination. To address this situation, the present exemplary embodiment reproduces a luminance range substantially equivalent to the luminance dynamic range of the input image data with use of the auxiliary illumination in addition to the standard illumination.

Now, suppose that the printed product on the glossy paper is irradiated with the standard illumination of 80 cd/m². When the luminance dynamic range of the input image data is 0 to 200%, the luminance dynamic range in which the maximum value is 200% can be reproduced if the paper white region of the printed product has twice the luminance of 80 cd/m², i.e., 160 cd/m². The present exemplary embodiment is constructed assuming that the printed product is irradiated with the standard illumination of 80 cd/m², and therefore irradiates the printed product with 80 cd/m² corresponding to the insufficiency with use of the auxiliary illumination. Due to this irradiation, the output luminance dynamic range of the printed product to be observed is raised as indicated by the solid line 1006 in FIG. 6A. Similarly, when the luminance dynamic range of the input image data is 0 to 400%, the luminance dynamic range in which the maximum value is 400% can be reproduced if the paper white region of the printed product has four times the luminance of 80 cd/m$^2$, i.e., 320 cd/m$^2$. Therefore, the output luminance dynamic range to be observed is raised as indicated by the solid line 1006 by irradiating the printed product with 240 cd/m$^2$ corresponding to the insufficiency with use of the auxiliary illumination.

Similarly, assume that the luminance on the paper white region under the standard illumination, i.e., the luminance corresponding to the reflectance of 100% is 60 cd/m$^2$, when the same input image is output on the mat paper. Then, 240 cd/m$^2$ is used to reproduce the luminance dynamic range of 0 to 400% held by the input image data. Therefore, the image processing apparatus 100 presents the illumination condition to the user so as to prompt the user to irradiate the printed product with 240−60=180 cd/m$^2$ corresponding to the insufficiency with use of the auxiliary illumination. Similarly, assume that the luminance on the paper white region under the standard illumination, i.e., the luminance corresponding to the reflectance of 100% is 40 cd/m$^2$, when the same input image is output on the plain paper. Then, 160 cd/m$^2$ is used to reproduce the luminance dynamic range of 0 to 400% held by the input image data. Therefore, the image processing apparatus 100 presents the illumination condition to the user so as to prompt the user to irradiate the printed product with 160−40=120 cd/m$^2$ corresponding to the insufficiency with use of the auxiliary illumination. The illumination condition determined in this case is the insufficiency of the luminance on the paper white region of the recording medium. In other words, this illumination condition means that the insufficiency of the luminance on the paper white region is this value, and notifies the user of irradiating the printed product with the auxiliary illumination so as to compensate for this insufficient luminance. The above-described processing is performed by the CPU 104 described with reference to FIG. 1A.

A wavelength band of the auxiliary illumination is assumed to be substantially equivalent to the standard illumination in principle, and therefore an intensity of the light with which the paper white region is irradiated can be considered as a sum of the standard illumination and the auxiliary illumination. Further, in the present exemplary embodiment, the auxiliary illumination having the variable illuminance is used in addition to the standard illumination, which is observation environment illumination, as the method for controlling the illumination condition under which the printed product is irradiated. The present exemplary embodiment can be configured to use one or more illumination source(s) having the variable illuminance, or can be configured to use only the illumination having the variable illuminance without using the standard illumination. Even in this case, the illumination condition is calculated by a similar method.

[Method for Presenting Illumination Condition]

Figure 7:
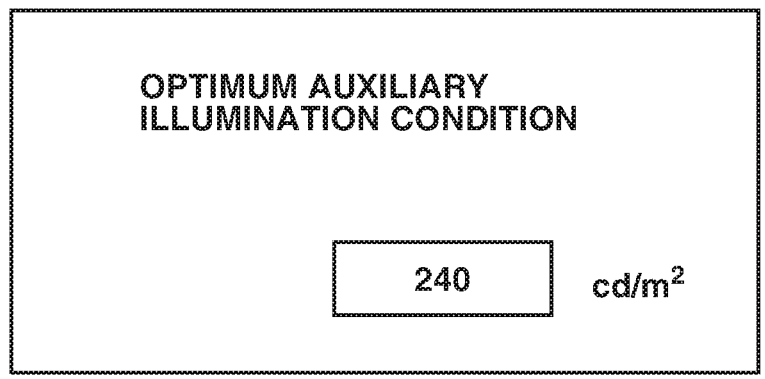
FIG. 7 illustrates a display unit presented to a user.

The luminance value of the auxiliary illumination calculated by the above-described method for determining the illumination condition is presented to the user (an operator). FIG. 7 illustrates an example of the auxiliary illumination condition displayed on the display unit 102 illustrated in FIG. 1A.

A flow of the data processing described so far will be described with reference to a flowchart illustrated in FIG. 8. First, in step S101, the image processing apparatus 100 analyzes the input image data (the RAW data) and the input image data information, which is the information at the time of the imaging. The input image data information needed at this time is the "information indicating the luminance dynamic range" and the "exposure information (the exposure compensation value) at the time of the imaging". Next, in step S102, the image output apparatus 111 acquires the characteristic of the recording medium to be used in the printing by the image output apparatus 111. This is the information acquired by the recording medium characteristic acquisition unit 205 illustrated in FIG. 2, and is selected from the data measured in advance and stored in the storage unit such as the ROM 120c. In the present exemplary embodiment, this information is the luminance value on the paper white region of the recording medium to be used in the printing. In step S103, the image processing apparatus 100 converts the luminance value of the input image data into the print luminance value. In the present exemplary embodiment, the image processing apparatus 100 converts the linearly developed underexposed image into the data in the luminance range corresponding to the reflectance of 0 to 100% as described with reference to FIGS. 6A and 6B. In step S104, the image processing apparatus 100 determines the illumination condition for returning the luminance range converted in step S103 to the luminance range originally held by the input image data, i.e., the illumination condition needed to reproduce the luminance range of the input image data. Then, the image processing apparatus 100 presents the determined illumination condition to the user. Lastly, in step S105, the image output apparatus 111 discharges the ink from the recording head 125 based on the recording data subjected to the above-described processing, thereby generating the printed product.

By the above-described processing, in the present exemplary embodiment, the image processing apparatus 100 calculates the illumination condition under which the printed product output by the image output apparatus 111, such as the printer, should be irradiated, based on the information indicating the luminance dynamic range of the input image data and the information regarding the exposure condition. As a result, the present exemplary embodiment allows the image to be reproduced in the luminance dynamic range of the input image data that is wider than the luminance dynamic range of the printed product.

The conversion processing performed on the RAW image is not limited to the linear conversion. Conversion processing to which a slight gamma curve is applied as indicated by a broken line 1009 in FIG. 9 can be performed. By this processing, the luminance of the printed product is raised as indicated by a solid line 1010. As described above, the linear conversion is carried out in the range of to 18% to maintain the 18% gray reflectance, and the conversion processing with the gamma curve applied thereto is performed in a luminance range higher than that, in so-called the normal processing, which does not control the illumination with which the printed product is irradiated. On the other hand, since the present exemplary embodiment is constructed assuming that the output luminance range is raised by controlling the illumination, the processing leading to a reduction in the luminance compared to when the above-described linear conversion is carried out, i.e., the processing leading to generation of a darker image as the image is performed in the range of 0 to 18%.

In the first exemplary embodiment, the image processing apparatus 100 is configured to present the optimum illumination condition to the user (the operator) and cause the user to adjust the illumination based on the presented condition, but the disclosure is not limited to this method. A second exemplary embodiment will be described as an example of a control system that automatically adjusts the illumination condition on an illumination apparatus side that exhibits the printed product, based on the illumination condition determined by the above-described method.

Figure 10A:
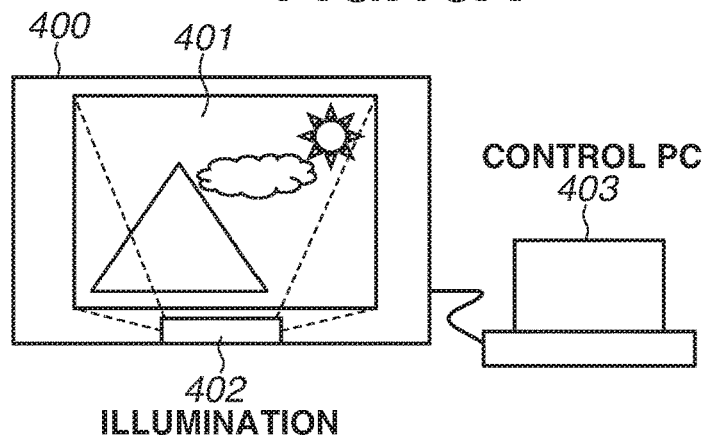
FIGS. 10A, 10B, and 10C each illustrate an example of a configuration of a system that controls an illumination condition.
Figure 10B:
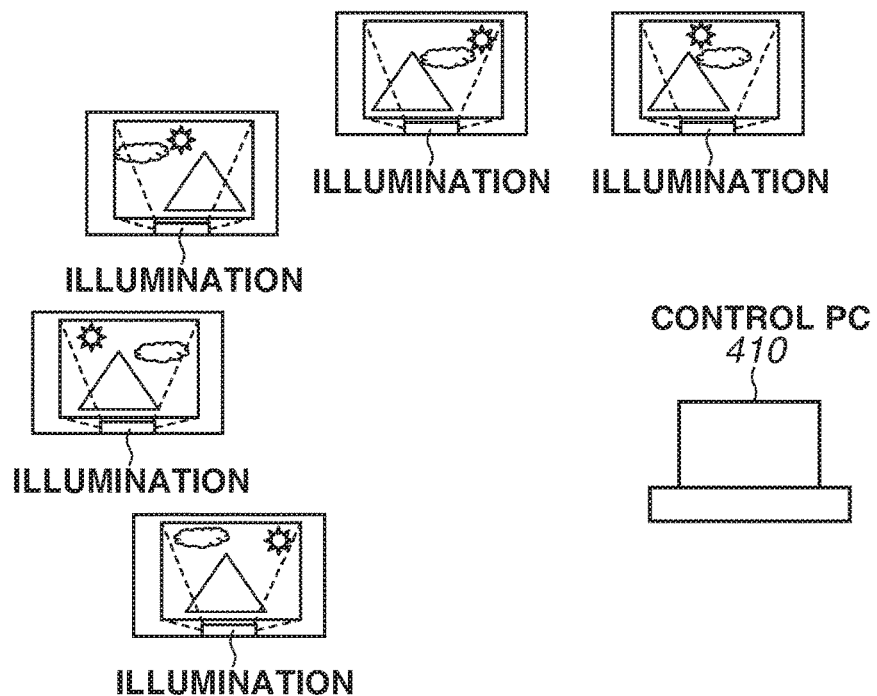
Figure 10C:
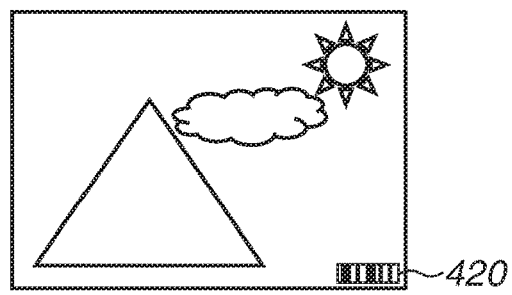

FIGS. 10A to 10C are each a configuration diagram illustrating an example thereof. The example illustrated in FIG. 10A is the following mechanism. A printed product 401 is exhibited at a predetermined position on an exhibition illumination apparatus 400. Then, the auxiliary illumination condition determined by the above-described method is transmitted from a control personal computer (PC) 403 to the exhibition illumination apparatus 400, and the printed product 401 is irradiated with set light from illumination 402. A broken line in the drawing indicates a general idea about how the light is emitted from the illumination 402 to the printed product 401. Besides the method for changing the illumination condition with use of the control PC 403, the adjustment of the illumination condition can be achieved by writing the illumination condition into a portable memory, such as a Secure Digital (SD) card, and equipping the exhibition illumination apparatus 400 side with a function of reading out that.

FIG. 10B illustrates a system in which a plurality of exhibition illumination apparatuses is connected to a central control PC 410 via wireless communication, such as Wi-Fi, and the illumination condition needed for the printed product exhibited on each of the illumination apparatuses is set from the control PC 410. Further, FIG. 10C illustrates the following system. An encrypted code 420 indicating a symbolized illumination condition like a so-called barcode is printed on the printed product itself. Then, when the printed product is mounted on the exhibition illumination apparatus, a reading device built in the exhibition illumination apparatus reads out the encrypted code, and the illumination condition is automatically adjusted. In one embodiment, the encrypted code on the printed product is printed so as to be prevented from being easily visually recognized with use of transparent ink or the like.

A third exemplary embodiment is a measure for expressing the printed product in High Dynamic Range (HDR) to deal with a current trend that display devices of cameras, liquid crystal televisions, and the like start supporting HDR. In other words, the expression of the printed product in HDR as a printed exhibition product is realized by combining the illumination as an auxiliary method to reproduce the wide luminance dynamic range held by the input image data on the printed product on the paper, which is the non-light emitting medium. Then, the third exemplary embodiment will be described as an example in which the image processing apparatus switches an operation in the case where the printed product is expressed in HDR by the adjustment using the auxiliary illumination or the like and an operation in the case where only the standard illumination is used like the conventional technique.

Figure 11A:
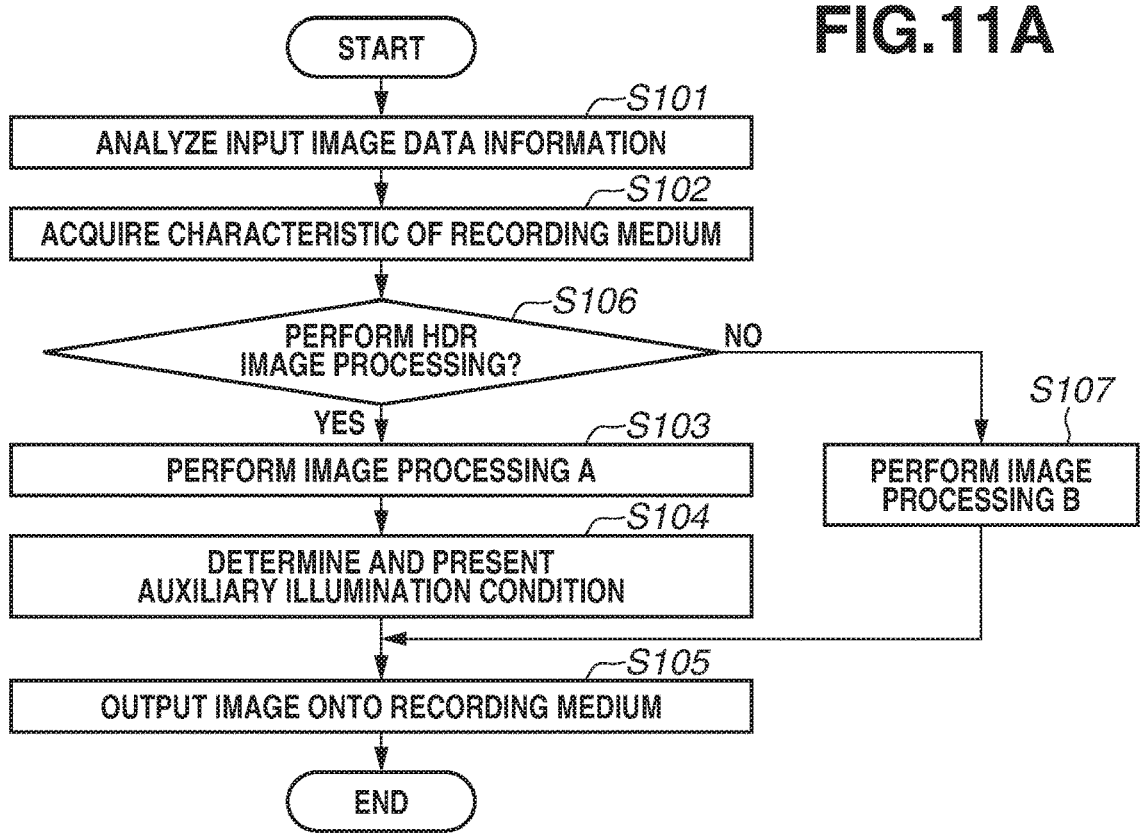
FIG. 11A is a flowchart illustrating processing according to a third exemplary embodiment.

FIG. 11A is a flowchart illustrating processing according to the present exemplary embodiment, and is a flowchart in which steps S106 and S107 are added to the above-described flowchart illustrated in FIG. 8. Steps S101 and S102 are similar to FIG. 8. In step S106, the image processing apparatus determines whether the input image data is data on which HDR image processing should be performed based on the analysis result in step S101. If confirming that the image is the linearly developed RAW data and is an image captured under the underexposure condition, i.e., the exposure compensation value is a negative value in the analysis of the input image data in step S101, the image processing apparatus sets an HDR processing execution flag to ON. On the other hand, if the input image data is the normal JPEG data, the image processing apparatus sets the HDR processing execution flag to OFF. The image processing apparatus determines whether to perform the HDR image processing based on the HDR processing execution flag set in this step, step S106. In a case where the execution flag is set to ON (YES in step S106), in step S103, the image processing apparatus performs similar image processing to the first exemplary embodiment (hereinafter referred to as image processing A). In a case where the execution flag is set to OFF, i.e., the HDR image processing is unnecessary (NO in step S106), the processing proceeds to step S107, in which the image processing apparatus performs the conventional image processing described with reference to FIG. 5B (hereinafter referred to as image processing B). In the case where the image processing A is performed in step S103, the adjustment of the illumination condition is performed, so that, in step S104, the image processing apparatus determines the illumination condition and presents the determined illumination condition to the user. In step S105, the image output apparatus outputs the image onto the recording medium specified by the user, based on the image data subjected to any of the image processing A and the image processing B, thereby generating the printed product.

Figure 11B:
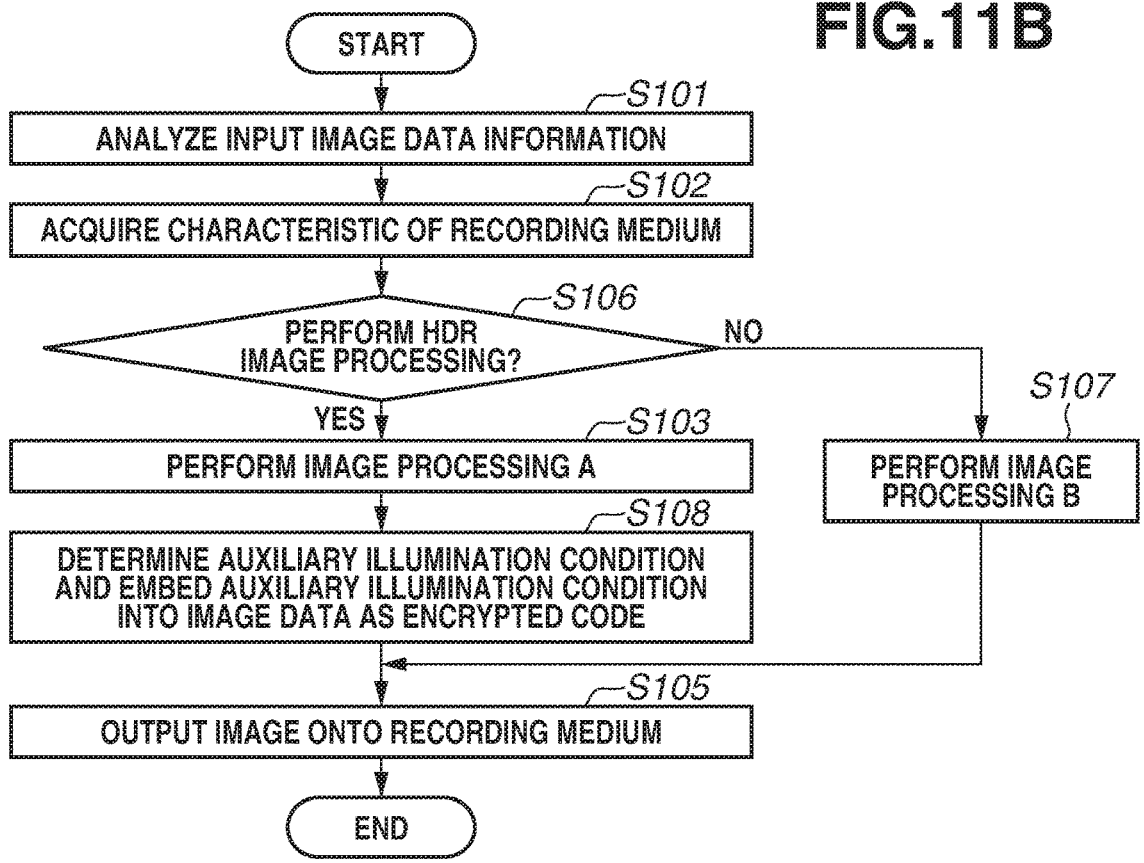
FIG. 11B is a flowchart illustrating processing according to a second exemplary embodiment.

FIG. 11B is a flowchart of processing corresponding to the exhibition illumination apparatus described in the second exemplary embodiment, and step S104 in FIG. 11A is replaced with step S108. This processing is processing for embedding the encrypted data indicating the illumination condition into the image data subjected to the image processing A for the adjustment of the illumination condition. In step S105, the image output apparatus outputs the image data with the illumination condition embedded as the encrypted data therein onto the recording medium, thereby generating the printed product.

In the above-described manner, in the present exemplary embodiment, the image processing apparatus automatically determines whether the HDR processing should be performed based on the input image data.

In the above-described exemplary embodiments, the illumination condition is adjusted assuming that the printed product is observed under the standard illumination of 80 cd/m$^2$. On the other hand, in a fourth exemplary embodiment, the user measures and acquires the illumination condition of the observation environment under which the printed product is observed. Then, the image processing apparatus presents the illumination condition under which the printed product should be actually irradiated with use of the acquired illumination condition of the observation environment.

Figure 13:
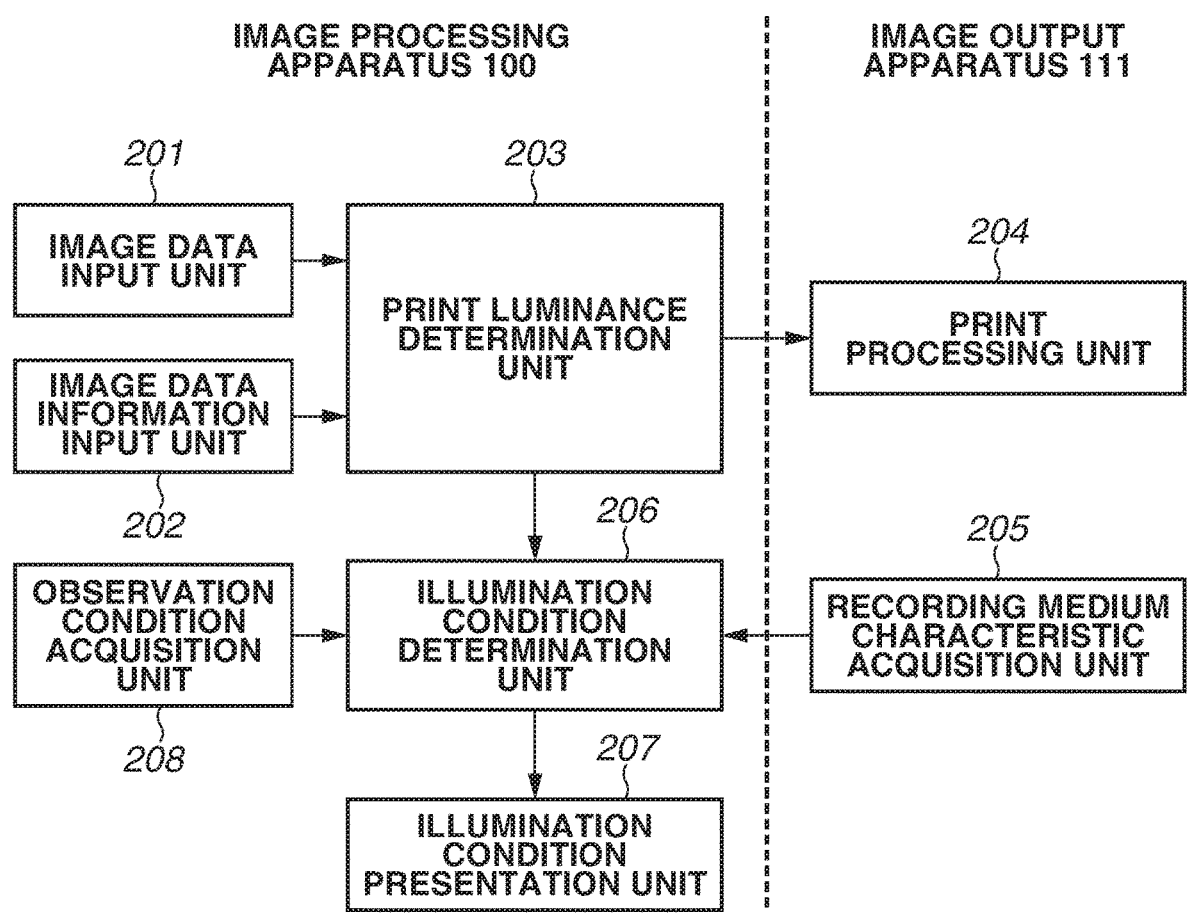
FIG. 13 illustrates an example of a processing configuration of the image processing apparatus and the image output apparatus.
Figure 14:
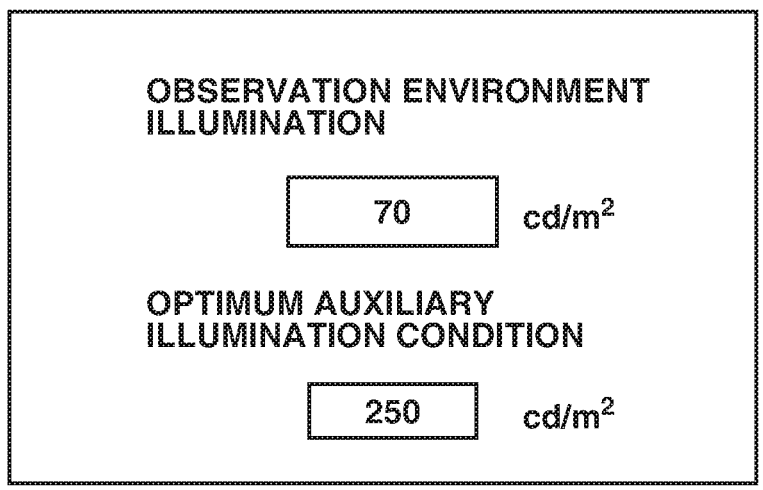
FIG. 14 illustrates an example of a screen on which the user inputs observation environment illumination.

FIG. 13 is a block diagram illustrating an example of a processing configuration of the image processing apparatus 100 and the image output apparatus 111 according to the present exemplary embodiment. The main configuration is similar to FIG. 2, but the image processing apparatus 100 further includes an observation condition acquisition unit 208 in the present drawing. The user measures brightness of the environment under which the user observes the printed product by a predetermined method, and the observation condition acquisition unit 208 acquires a value of the observation environment illumination that is a result of this measurement. FIG. 14 illustrates an example of a screen on which the user inputs the value of the observation environment illumination that is the result of the measurement. The method for measuring the observation environment illumination by the user can be measurement using a dedicated illuminance meter or can be simplified measurement of the illuminance using a smartphone camera that is provided as a free application for the smartphone.

Then, the illumination condition determination unit 206 calculates the illumination condition, and the illumination condition presentation unit 207 presents a result of this calculation to the user. In the present example, the illumination condition is calculated based on the difference between the luminance dynamic range of the input image data and the luminance dynamic range of the print data, the characteristic data of the recording medium, and the value of the observation environment illumination acquired by the observation condition acquisition unit 208. For example, if the value of the observation environment illumination acquired from the user is 70 $cd/m^2$ and the illumination condition needed to reproduce the input luminance dynamic range is 320 $cd/m^2$, 320−70=250 $cd/m^2$ is presented as the needed illumination condition.

Figure 15:
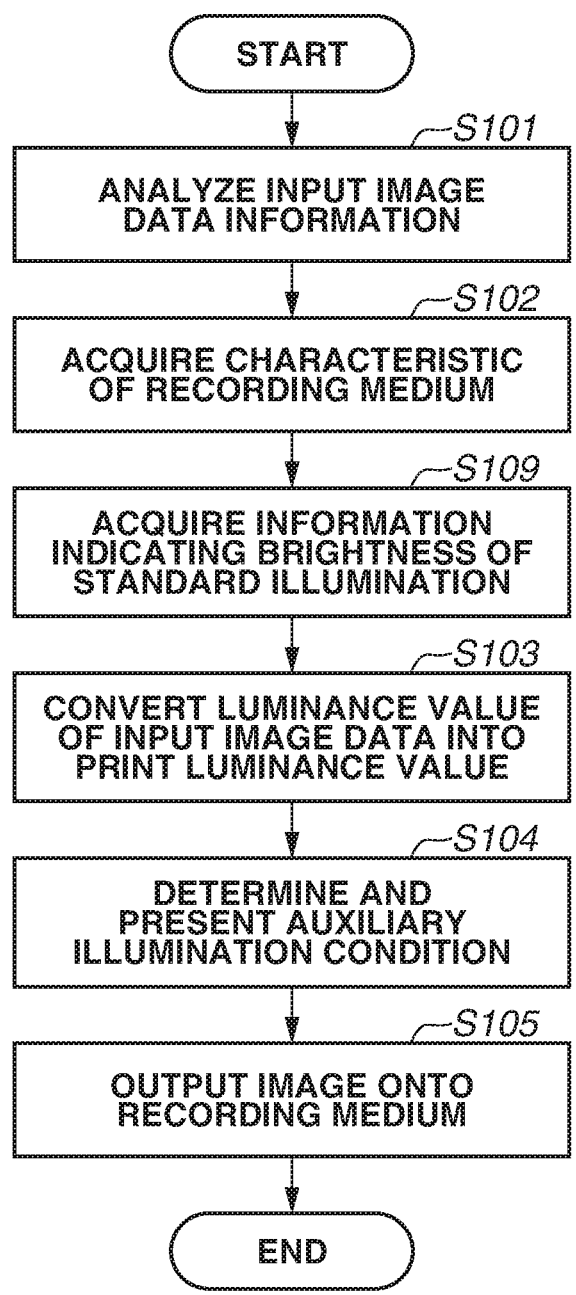
FIG. 15 is a flowchart illustrating processing according to a fourth exemplary embodiment.

FIG. 15 is a flowchart illustrating a procedure of processing according to the present exemplary embodiment. This processing is similar to the processing described with reference to FIG. 8 according to the first exemplary embodiment, except for step S109. In step S101, the image processing apparatus 100 analyzes the input image data information. In step S102, the image output apparatus 111 acquires the characteristic of the recording medium. Next, in step S109, the image processing apparatus 100 acquires the observation environment illumination condition. More specifically, the observation environment illumination condition is the information indicating the brightness of the observation environment illumination condition acquired by the observation condition acquisition unit 208 illustrated in FIG. 13.

In the above-described manner, in the present exemplary embodiment, the image processing apparatus 100 includes the acquisition unit that acquires the illumination condition of the observation environment from the user, and determines the illumination condition under which the printed product is irradiated based on the acquired value. This configuration allows the image processing apparatus 100 to determine the illumination condition optimum for the user's observation environment.

In a fifth exemplary embodiment, the user inputs an upper limit value settable as the auxiliary illumination with which the printed product is irradiated together with the brightness of the illumination of the observation environment under which the printed product is observed. Then, the fifth exemplary embodiment is characterized in that the input image data is subjected to the gamma processing according to the upper limit value of the illumination condition without being linearly converted, if the value of the auxiliary illumination calculated based on the input image data exceeds the upper limit value acquired from the user.

FIG. 16 illustrates an example of a screen on which the user configures settings according to the present exemplary embodiment. In the present example, the user specifies the upper limit value of the brightness with which the auxiliary illumination to be used by the user can irradiate the printed product, at the same time as setting the brightness of the illumination of the observation environment measured by the user that has been described in the fourth exemplary embodiment. In the present exemplary embodiment, an operation in a case where the upper limit value of the auxiliary illumination is 160 $cd/m^2$ will be described.

Figure 17:
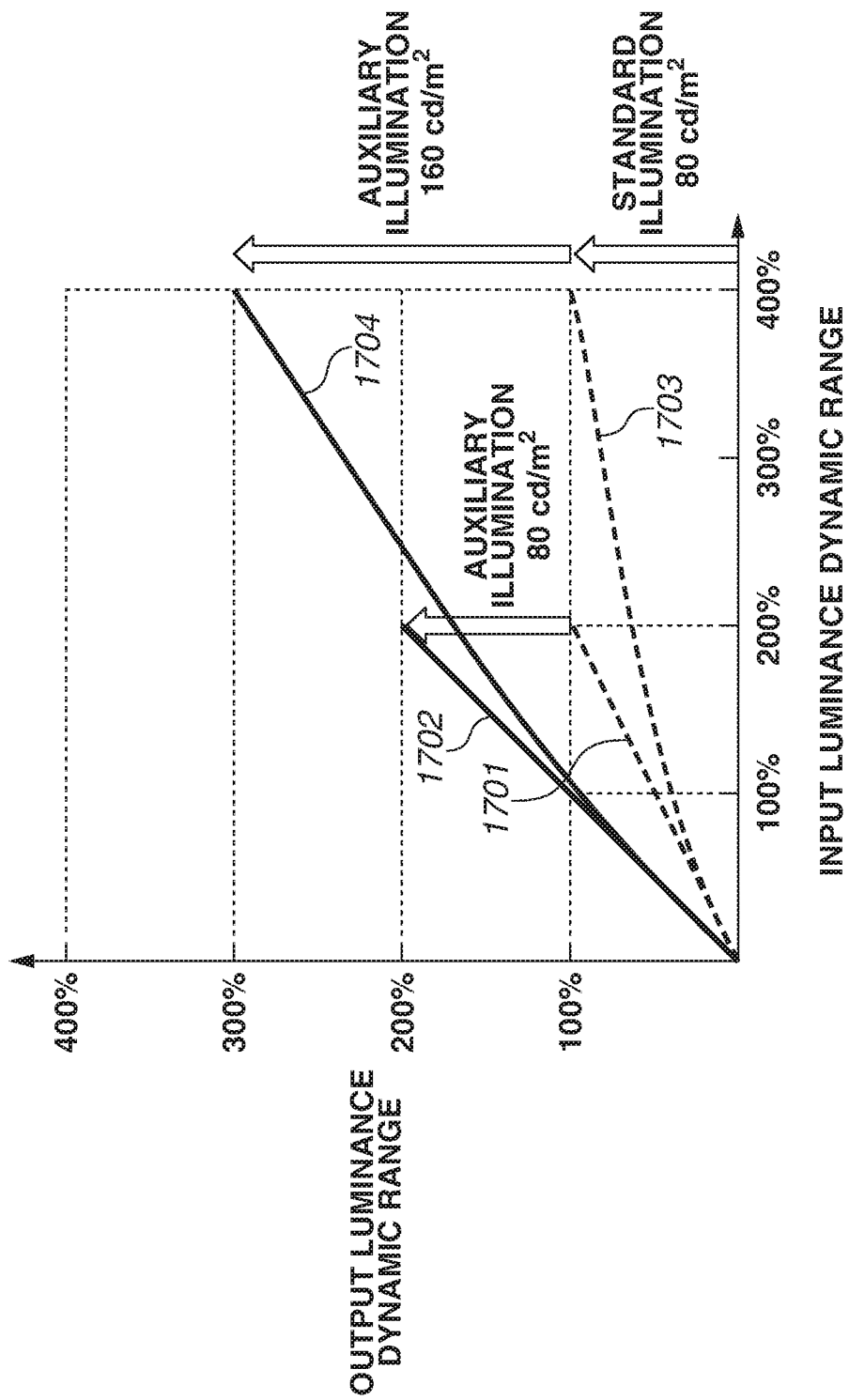
FIG. 17 illustrates conversion processing and a method for determining the illumination condition according to a fifth exemplary embodiment.

Conversion processing and a method for determining the illumination condition according to the present exemplary embodiment will be described with reference to FIG. 17. If the input image data has the luminance dynamic range of 0 to 200% and is the RAW image data captured with the exposure compensation value set to −1 (underexposure by one exposure value), the printed product should be irradiated with the 80 $cd/m^2$ as the auxiliary illumination in addition to 80 $cd/m^2$, which is the brightness of the observation environment. Since the upper limit value of the auxiliary illumination is 160 $cd/m^2$, the printed product can be irradiated with 80 $cd/m^2$. Therefore, the conversion processing is performed as indicated by a broken line 1701, and the illumination condition is presented to the user so as to prompt the user to irradiate the printed product with 80 $cd/m^2$ as the auxiliary illumination. As a result, the linearly developed image can be reproduced in the luminance dynamic range of 0 to 200% held by the input data as indicated by a solid line 1702 in FIG. 17.

Similarly, supposing that the input image data has the luminance dynamic range of 0 to 400% and is the RAW image data captured with the exposure compensation value set to −2 (underexposure by two exposure values), an operation in this case will be described now. The linearly developed image can be reproduced in the luminance dynamic range of 0 to 400% held by the input data if the printed product can be irradiated with 240 $cd/m^2$ as the auxiliary illumination in addition to 80 $cd/m^2$, which is the brightness of the observation environment. However, the auxiliary illumination can irradiate the printed product only with the upper limit value 160 $cd/m^2$ at most. In this case, the input luminance dynamic range is reproduced within a possible range by irradiating the printed product with 80 $cd/m^2$, which is the brightness of the observation environment, and 160 $cd/m^2$, which is the upper limit of the auxiliary illumination. In the present example, a gamma is applied to the input image data having the luminance dynamic range of 0 to 400% as indicated by a broken line 1703 in the drawing. This is processing for adjusting the output luminance dynamic range to 0 to 300% according to the brightness of 240 $cd/m^2$ in total, and can raise the luminance range of the printed product irradiated with the illumination of 240 $cd/m^2$ in total as indicated by a solid line 1704. The condition is presented to the user so as to prompt the user to set 160 $cd/m^2$, which is the upper limit value of the brightness of the auxiliary illumination, as illustrated in FIG. 16.

In any of the above-described cases, the conversion processing leading to the reduction in the luminance compared to when the linear conversion is carried out is performed in the range where the luminance is 0 to 18%, similarly to the above-described exemplary embodiments.

In the above-described exemplary embodiments, the conversion processing is performed on the input image data assuming that the illumination condition of the observation environment is adjusted, but a sixth exemplary embodiment will be described as a case that supports both when the illumination condition is adjusted and when the image is observed without the illumination condition of the observation environment adjusted. More specifically, the input image data is linearly developed if the brightness of the illumination of the observation environment is darker than predetermined brightness, and the input image data is developed while the gamma is applied thereto if the brightness of the illumination of the observation environment is the predetermined brightness or brighter.

Figure 18:
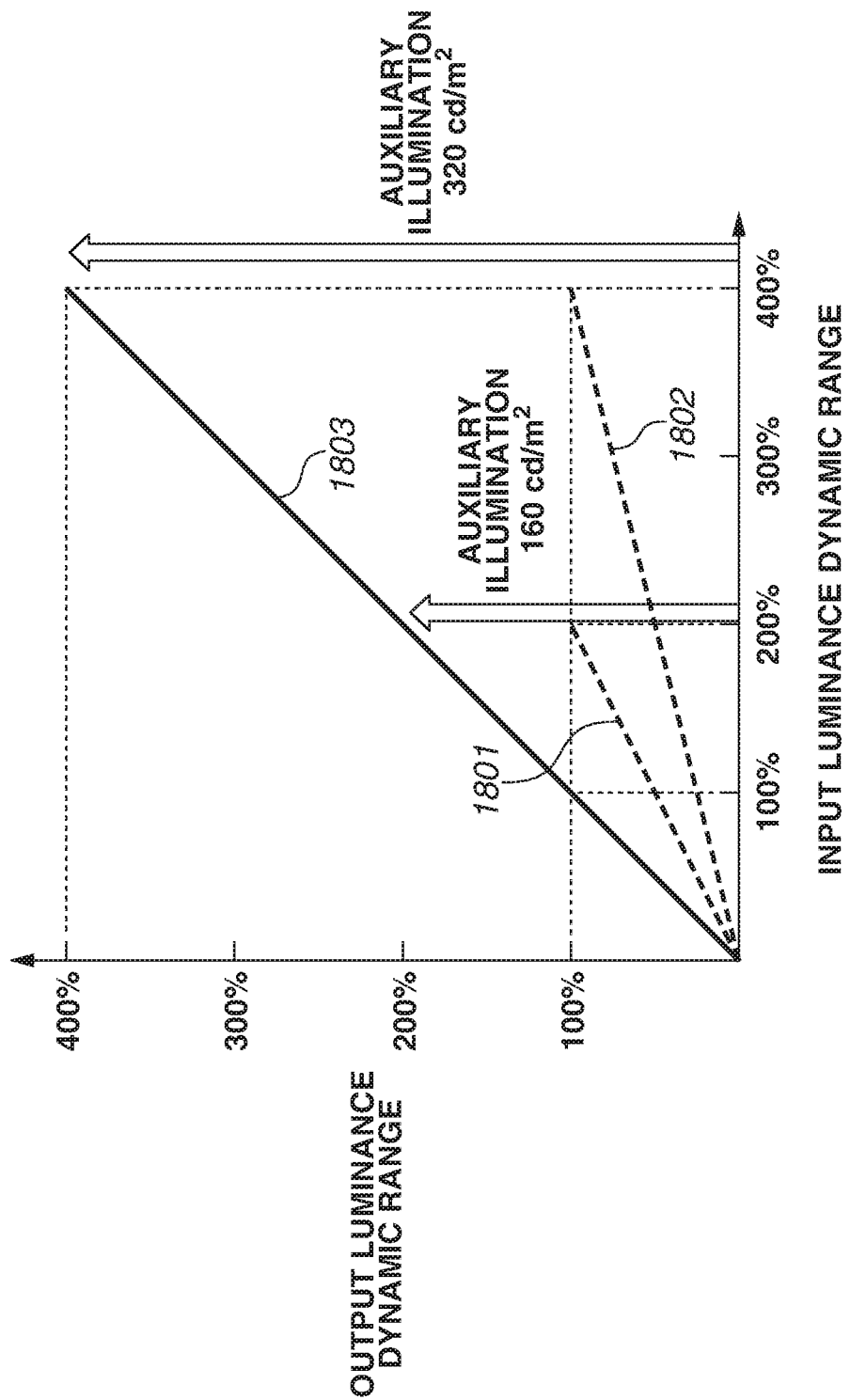
FIG. 18 illustrates a relationship between the input luminance range and the output luminance range.

FIG. 18 illustrates a relationship between the luminance dynamic ranges when the printed product is irradiated with only the auxiliary illumination with the standard illumination set to 0 cd/m², i.e., in a completely dark room. In this case, the image cannot be observed without the auxiliary illumination, which basically excludes the possibility that the printed product is irradiated with only the standard illumination. If the input image data has the luminance dynamic range of 0 to 200% and the exposure compensation value is −1, conversion processing like a broken line 1801 is performed on the input image data. Then, the luminance range is raised as indicated by a solid line 1803 due to the irradiation of the printed product with the auxiliary illumination set to 160 cd/m².

Similarly, if the input image data has the luminance dynamic range of 0 to 400% and the exposure compensation value is −2, conversion processing like a broken line 1802 is performed on the input image data. Then, the luminance range is raised as indicated by a solid line 1803 due to the irradiation of the printed product with the auxiliary illumination set to 320 cd/m².

On the other hand, an operation in the case where the image can be observed without the illumination condition adjusted will be described. Now, assume that the brightness of the standard illumination is 80 cd/m² similarly to the first exemplary embodiment. The present exemplary embodiment is directed to reproducing the image having the high dynamic range by adding the auxiliary illumination according to the luminance dynamic range of the input image data, but, at the same time, possible cases include a lack of the irradiation with the auxiliary illumination, i.e., observing the image even when the image is irradiated with only the standard illumination. As described above, the linearly developed image is observed as a dark image under the standard illumination compared to the image developed while the gamma is applied thereto assuming that the image is observed under the standard illumination. Therefore, in the present exemplary embodiment, if the standard illumination is equal to or more than 80 cd/m², the input image data is developed while the gamma is applied thereto with importance also placed on the case in which the image is observed with use of only the standard illumination. If the standard illumination is lower than 80 cd/m², the input image data is linearly developed assuming that the image is observed while being irradiated with the auxiliary illumination. Then, even in the case where the processing for applying the gamma is performed, i.e., even in the case where the input image data is developed assuming that the image is observed without the illumination condition adjusted, the conversion processing is performed so as to reduce the luminance compared to when the image is linearly developed with respect to the 18% gray reflectance in consideration of the observation of the image with the illumination condition adjusted.

Which conversion should be employed as the characteristic of the luminance conversion between the input and the output, the linear conversion or the gamma conversion, is determined based on a threshold value set to cd/m², which is the standard observation environment defined by sRGB described in the first exemplary embodiment, but the threshold value is not limited to this brightness. Further, the present exemplary embodiment has been described based on the example in which the input image data is developed while the gamma is applied thereto if the brightness of the standard illumination is the threshold value or brighter, and the input image data is linearly developed if the brightness of the standard illumination is darker than the threshold value, but can be configured to carry out different gamma conversions between when the brightness of the standard illumination is darker than the threshold value and when the brightness of the standard illumination is the threshold value or brighter.

In a seventh exemplary embodiment, the brightness of the standard illumination is roughly set from a representative use case in advance and the auxiliary illumination condition is set, when there is no measure for acquiring the brightness of the observation environment. The illuminance for each of commonly seen environments is different for each of them, as an office environment in Japan is 600 lx, an office environment in Europe and the United States is 500 lx, a home environment in Japan is 300 lx, and a home environment in Europe and the United States is 200 lx. When the unit of each value is converted into candela (cd/m²), the office environment in Japan is approximately 200 cd/m², the office environment in Europe and the United States is approximately 170 cd/m², the home environment in Japan is approximately 100 cd/m², and the home environment in Europe and the United States is approximately 70 cd/m².

An operation in a case where the user selects the office environment in Japan as the observation environment will be described with reference to FIG. 19. As described above, the brightness of the illumination of the observation environment is regarded as 200 cd/m². In the above description, the reflectance on the paper when the printed product is irradiated by the standard light source of 80 cd/m² is defined to be 100%, so that the output luminance has a range of 200÷80=250% when the brightness of the standard illumination is 200 cd/m² as described above.

Figure 19:
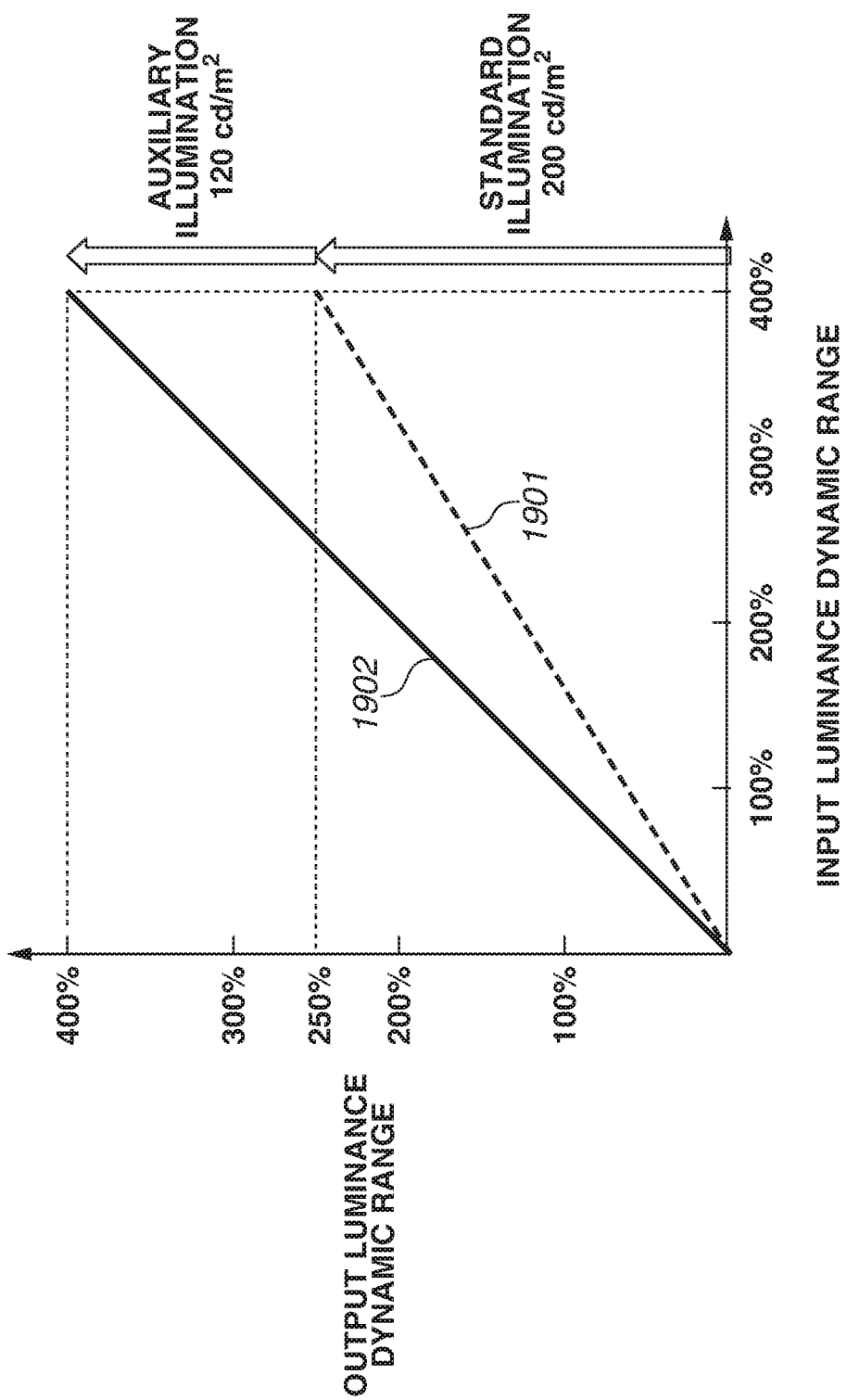
FIG. 19 illustrates a relationship between the input luminance range and the output luminance range.

Then, if the input image data has the luminance dynamic range of 0 to 400% and is the RAW image captured with the exposure compensation value set to −2 (underexposure by two exposure values), conversion processing as indicated by a broken line 1901 in FIG. 19 is performed. Then, the printed product is irradiated with 150% corresponding to the insufficiency, i.e., 80÷100×150=120 cd/m² as the auxiliary illumination in addition to 200 cd/m², which is the brightness of the observation environment, i.e., the output luminance of 250%. Due to this irradiation, the luminance of the printed product is raised as indicated by a solid line 1902, and the luminance dynamic range of 0 to 400% held by the input data can be reproduced. At this time, the condition is presented to the user so as to prompt the user to set 120 cd/m² as the brightness of the auxiliary illumination as illustrated in FIG. 20.

Further, the above-described exemplary embodiments have been described based on the example in which the RAW data is input as the input image data and the image processing is performed with use of the exposure compensation value in the Exif data as the imaging condition. The RAW data is used for the following reason. If an original image expresses the color by 8 bits for each of R, G, and B, i.e., 24 bits in total, this is insufficient when, for example, the image is combined, and aims of the use of the RAW data also include, as one of them, avoiding image deterioration due to generation of a fraction and occurrence of a rounding error when the image is combined. On the other hand, in recent years, a concept of combining images with use of color data of 24 bits or more has been proposed. This concept is called high dynamic range rendering, and image formats capable of handling the color data of 24 bits or more are collectively called High Dynamic Range Imaging (HDRI). One exemplary embodiment of the disclosure may be configured to use, for example, JPEG-HDR data (capable of storing an image in 32-bit color at most while maintaining compatibility with conventional JPEG) in the HDRI file format developed by Dolby Laboratories, Inc. among them instead of the RAW data.

Further, the above-described exemplary embodiments have been described based on the example in which the input image data and the information regarding the imaging condition are directly input from the imaging unit, such as the camera, to the printer, but are not limited to this configuration. For example, one exemplary embodiment of the disclosure can be configured to receive the input image data and the information regarding the imaging condition from a storage medium, such as a memory card.

Now, in some example, an image quality of an appearance of an exhibition product (the printed product+the auxiliary illumination) to be observed, i.e., the luminance dynamic range felt by the observer in this case is kept the same even when the optimum illumination condition is set so as to have some range in consideration of a sensitivity of human eyes to the light intensity, and this example will be described.

Generally, human five senses are proportional to a logarithm, and this is known as the Weber-Fechner law (hereinafter referred to as the WF law). The WF law is expressed by the following equations (1) and (2), and a stimulus value that changes a perceived value by 1 can be discriminated by the human sense:

$$\Delta \text{stimulus amount/stimulus amount} = K, \text{ wherein } K \text{ is a constant value} \quad (1), \text{ and}$$

$$\text{perceived amount} = K \times \text{Log(stimulus amount)} \quad (2).$$

Then, the sensitivity of human eyes to the light intensity also follows this WF law. For example, a magnitude of a star in the night sky is one example thereof. Light intensities from a brightest first-magnitude star to a visible sixth-magnitude star are different from one another in such a manner that the light intensity increases so as to be multiplied by a fifth root of 100 (=2.512) every time the level increases by one magnitude. In other words, there is a difference as large as 100 times in the light intensity between the first-magnitude star and the sixth-magnitude star.

Figures 21A, 21B:
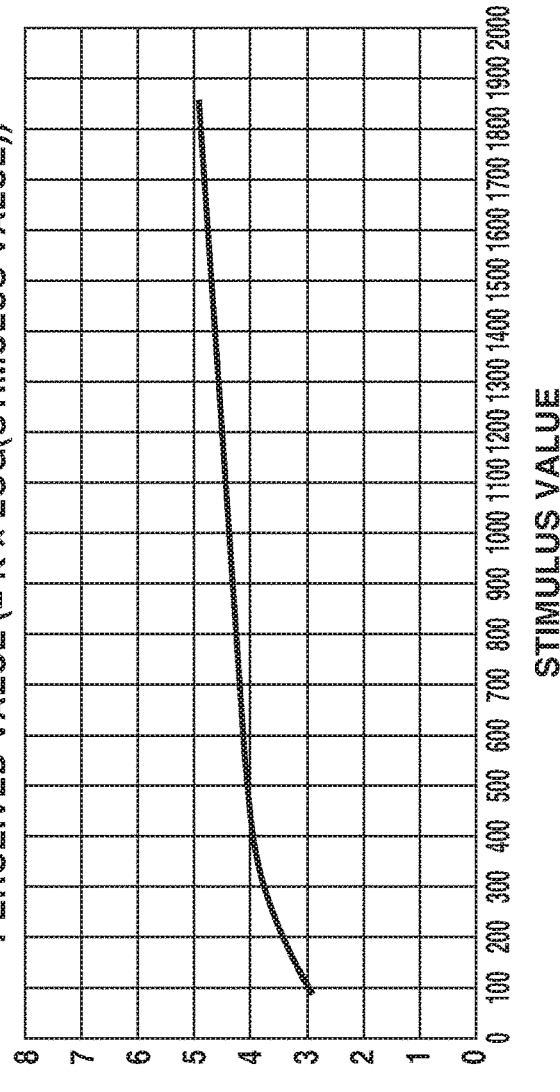
FIGS. 21A and 21B illustrate the Weber-Fechner law.

FIG. 21A is a table listing examples of numeral values indicating the relationship expressed by the equation (1) with use of these star magnitudes as one example, and FIG. 21B is a graph graphically indicating the equation (2). In this example, the stimulus value is a numerical value indicating the light intensity. This table indicates that the human sense can discriminate a difference from a stimulus value of 251.2 when the stimulus value is 100, and can discriminate a difference from a stimulus value of 1004.8 when the stimulus value is 400. Further, in FIG. 21B, K is determined to be K=1.512 from the table illustrated in FIG. 21A. As described above, the human sense can discriminate the stimulus value that changes the perceived value by 1. The graph illustrated in FIG. 21B means that the human sense can discriminate a light intensity corresponding to a stimulus value of 500 (the perceived value is approximately 4) and a light intensity corresponding to a stimulus value of 1850 (the perceived value is approximately 5) from each other, but feels that light intensities therebetween are approximately the same. Further, this graph means that, regarding weaker light, the human sense can discriminate a stimulus value of 100 (the perceived value is approximately 3), and feels that light intensities corresponding to stimulus values of 100 to 500 are approximately the same.

In the present example, the light of the stars in the night sky has been described by way of example, but the value of K is different depending on a condition, i.e., an surrounding environment even when the light intensity is the same. The discriminable Δstimulus value is different between a dark room and a bright room even when the same change in the light is observed in each of them. This means that a range where light is perceived as light of the same intensity is different depending on the environment.

FIG. 22 illustrates an example of the method for presenting the illumination condition in consideration of the above-described human sensitivity. In one embodiment, by measuring the observation environment illumination (in this case, the luminance on the paper white region of the printed product 504 irradiated with only the room illumination 502 illustrated in FIG. 12) in advance, and inputting a value thereof, this method presents the upper limit value, the optimum value, and a lower limit value of the auxiliary illumination condition needed in addition to this observation environment illumination.

In the above-described manner, according to the WF law, a similar effect can be provided to the observer even when the illuminance of the auxiliary illumination is set to a lower value than a theoretical value. This can also be said to be effective from the viewpoint of energy saving. As a specific method for determining the lower limit value, the optimum value, and the upper limit value, the optimum value is determined from the input image data information as described in the first exemplary embodiment when the luminance of the observation environment illumination is measured and the value thereof is input. In this optimum value, the observation environment illumination is already taken into consideration. Then, the upper limit value and the lower limit value can be calculated from the following equations (3) and (4):

$$\text{upper limit value} = \text{optimum value} \times \text{coefficient 1} \quad (3),$$

and $$\text{lower limit value} = \text{optimum value} \times \text{coefficient 2} \quad (4).$$

The coefficient 1 and the coefficient 2 are considered to change depending on the value of the optimum value, but this change can be handled by determining in advance how large values these values should be set to according to the value of the optimum value in an experiment conducted in advance, i.e., the condition of the observation environment illumination. It is considered that a plurality of coefficients is supposed to be prepared according to the value of the optimum value. This means that a degree of human ability to visually recognize the light intensity has some range. Then, these values can be databased and recorded in the storage unit such as the ROM in advance.

The aspect of the embodiments allows the input image data having the wide luminance dynamic range, such as the RAW data, to be reproduced in a further wide luminance range by appropriately determining the illumination condition under which the printed product is irradiated.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-089640, filed Apr. 28, 2017, which is hereby incorporated by reference herein in its entirety.

What is claimed is:

1. An apparatus configured to determine an illumination condition for irradiating a printed product with light, the printed product being generated by outputting an image onto a recording medium based on fed input image data, the apparatus comprising:
an input unit configured to receive input of luminance dynamic range information of the input image data and exposure condition information at a time of imaging regarding the input image data;
an acquisition unit configured to acquire characteristic information of the recording medium; and
a determination unit configured to determine the illumination condition based on the luminance dynamic range information, the exposure condition information, and the characteristic information.

2. The apparatus according to claim 1, wherein the acquisition unit acquires the characteristic information based on information indicating a type of the recording medium on which the printed product is output.

3. The apparatus according to claim 1, wherein the determination unit calculates the illumination condition with use of a luminance value on a paper white region that is indicated by the characteristic information.

4. The apparatus according to claim 1, wherein the exposure condition information is an exposure compensation value, and a value thereof is negative.

5. The apparatus according to claim 1, wherein the determined illumination condition is information indicating a luminance on a paper white region of the recoding medium.

6. The apparatus according to claim 1, wherein the input image data is RAW image data or JPEG-HDR data.

7. The apparatus according to claim 1, wherein a luminance dynamic range indicated by the luminance dynamic range information is wider than a luminance dynamic range reproducible on the recording medium.

8. The apparatus according to claim 7, wherein the determined illumination condition is a condition for reproducing the luminance dynamic range indicated by the luminance dynamic range information by irradiating the printed product with the light.

9. The apparatus according to claim 1, further comprising a presentation unit configured to present information regarding the determined illumination condition.

10. The apparatus according to claim 9,
wherein the printed product is observed by being irradiated with light from observation environment illumination and light from illumination having a variable illuminance, and
wherein the information presented by the presentation unit is information regarding an illumination condition of the illumination having the variable illuminance.

11. The apparatus according to claim 10, further comprising a second acquisition unit configured to acquire information regarding the observation environment illumination from a user,
wherein the determination unit determines the illumination condition further based on the information regarding the observation environment illumination.

12. The apparatus according to claim 10, further comprising a third acquisition unit configured to acquire an upper limit value of the illumination condition realized by the illumination having the variable illuminance from a user,
wherein the determination unit determines the illumination condition further based on the upper limit value.

13. The apparatus according to claim 1, further comprising a generation unit configured to generate output luminance data having a narrower luminance dynamic range than the luminance dynamic range of the input image data, based on the luminance dynamic range information and the exposure condition information.

14. The apparatus according to claim 13, wherein the output luminance data is generated by linearly converting the input image data.

15. The apparatus according to claim 13, wherein the output luminance data is generated by linearly converting the input image data with respect to a luminance value at which the luminance dynamic range of the input image data is equal to or less than 18% and converting the input image data while applying a gamma with respect to a luminance value at which the luminance dynamic range of the input image data is higher than 18%.

16. A system comprising:
the information processing apparatus according to claim 13; and
an image output apparatus configured to generate the printed product based on the output luminance data.

17. A system comprising:
an information processing apparatus configured to determine an illumination condition for irradiating a printed product with light, the printed product being generated by outputting an image onto a recording medium based on fed input image data, the apparatus comprising:
an input unit configured to receive input of luminance dynamic range information of the input image data and exposure condition information at a time of imaging regarding the input image data;
an acquisition unit configured to acquire characteristic information of the recording medium; and
a determination unit configured to determine the illumination condition based on the luminance dynamic range information, the exposure condition information, and the characteristic information; and
a control apparatus configured to control illumination with which the printed product is irradiated, based on the illumination condition determined by the determination unit.

18. The system according to claim 17, wherein the information processing apparatus and the control apparatus are wirelessly connected to each other.

19. A method for determining an illumination condition for irradiating a printed product with light, the printed product being generated by outputting an image onto a recording medium based on fed input image data, the method comprising:
receiving inputs of luminance dynamic range information of the input image data and exposure condition information at the time of imaging regarding the input image data;
acquiring characteristic information of the recording medium; and
determining the illumination condition based on the luminance dynamic range information, the exposure condition information, and the characteristic information.

20. The method according to claim 19, wherein the acquiring acquires the characteristic information based on information indicating a type of the recording medium on which the printed product is output.

* * * * *